(12) United States Patent
Zhu et al.

(10) Patent No.: US 12,245,261 B2
(45) Date of Patent: Mar. 4, 2025

(54) METHOD AND APPARATUS FOR CHANNEL AND INTERFERENCE MEASUREMENT IN A WIRELESS COMMUNICATIONS SYSTEM

(71) Applicant: Samsung Electronics Co., Ltd., Suwon-si (KR)

(72) Inventors: Dalin Zhu, Richardson, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 413 days.

(21) Appl. No.: 17/657,686

(22) Filed: Apr. 1, 2022

(65) Prior Publication Data
US 2022/0322361 A1    Oct. 6, 2022

Related U.S. Application Data

(60) Provisional application No. 63/171,351, filed on Apr. 6, 2021.

(51) Int. Cl.
*H04W 4/00*    (2018.01)
*H04W 56/00*    (2009.01)
(Continued)

(52) U.S. Cl.
CPC ....... *H04W 72/541* (2023.01); *H04W 56/001* (2013.01); *H04W 72/046* (2013.01); *H04W 72/23* (2023.01); *H04W 72/542* (2023.01)

(58) Field of Classification Search
CPC ............. H04W 72/082; H04W 72/085; H04W 72/046; H04W 72/042; H04W 56/001
(Continued)

(56) References Cited

U.S. PATENT DOCUMENTS 11,140,678 B2 *   10/2021   Sahlin ................... H04L 1/1812
11,337,265 B2 *    5/2022   Zhou .................... H04L 27/2692
(Continued)

FOREIGN PATENT DOCUMENTS

WO    2019017751 A1    1/2019

OTHER PUBLICATIONS

International Search Report and Written Opinion issued Jul. 8, 2022 regarding International Application No. PCT/KR2022/004978, 7 pages.
(Continued)

*Primary Examiner* — Marceau Milord

(57) ABSTRACT

Methods and apparatuses for channel and interference measurement in a wireless communication system. A method for operating a user equipment (UE) includes receiving a reporting setting and receiving a resource setting associated with the reporting setting. The reporting setting is configured with a higher layer parameter reportQuantity that is set to at least cri-SINR. The resource setting is configured with a higher layer parameter resourceType that is set to aperiodic, periodic, or semi-persistent. The method further includes receiving a first set of reference signals (RSs) through a first set of RS resources; receiving a second set of RSs through a second set of RS resources; measuring at least one RS in the first or second sets of RSs; and determining, based on the reporting setting and the measured at least one RS, one or more layer-1 signal-to-noise and interference ratios (L1-SINRs).

15 Claims, 10 Drawing Sheets

(51) Int. Cl.
*H04W 72/044* (2023.01)
*H04W 72/23* (2023.01)
*H04W 72/541* (2023.01)
*H04W 72/542* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 11,432,268 | B2* | 8/2022 | Yamamoto | H04W 72/23 |
| 11,589,215 | B2* | 2/2023 | Saber | H04W 72/535 |
| 11,664,869 | B2* | 5/2023 | Zhou | H04W 56/001 |
| | | | | 370/329 |
| 11,683,807 | B2* | 6/2023 | Lee | H04W 72/21 |
| | | | | 370/330 |
| 11,729,752 | B2* | 8/2023 | Sahlin | H04L 5/003 |
| | | | | 370/336 |
| 11,785,605 | B2* | 10/2023 | Yamamoto | H04W 72/23 |
| | | | | 370/329 |
| 11,811,538 | B2* | 11/2023 | Papasakellariou | H04L 1/1861 |
| 11,870,224 | B2* | 1/2024 | Andrei | H05K 7/20854 |
| 11,903,018 | B2* | 2/2024 | Choi | H04W 72/566 |
| 2016/0135148 | A1 | 5/2016 | Novlan et al. | |
| 2018/0167933 | A1* | 6/2018 | Yin | H04L 5/0053 |
| 2019/0058517 | A1 | 2/2019 | Kang et al. | |
| 2019/0069321 | A1* | 2/2019 | Akkarakaran | H04L 5/0091 |
| 2020/0100241 | A1* | 3/2020 | Takeda | H04L 5/0007 |
| 2020/0187226 | A1* | 6/2020 | Choi | H04W 72/566 |
| 2020/0196343 | A1* | 6/2020 | Marinier | H04L 1/1896 |
| 2020/0305147 | A1* | 9/2020 | Lee | H04L 1/1664 |
| 2021/0320702 | A1* | 10/2021 | Zhou | H04B 7/0626 |
| 2022/0007442 | A1* | 1/2022 | Novlan | H04B 7/15507 |
| 2022/0095254 | A1* | 3/2022 | Zhu | H04L 5/005 |
| 2022/0263558 | A1* | 8/2022 | Zhu | H04B 7/0617 |
| 2022/0286177 | A1* | 9/2022 | Zhu | H04L 5/0057 |
| 2022/0295498 | A1* | 9/2022 | Zhu | H04B 7/0626 |
| 2022/0345267 | A1* | 10/2022 | Zhou | H04B 7/0626 |
| 2022/0361165 | A1* | 11/2022 | Yamamoto | H04L 5/0091 |
| 2024/0137097 | A1* | 4/2024 | Bhamri | H04B 7/0695 |

OTHER PUBLICATIONS

Nokia et al., "Corrections on NR enhanced MIMO", 3GPP TSG-RAN WG1 Meeting #101-e, R1-2005160, May 2020, 25 pages.

Nokia, "Introduction of NR enhanced MIMO", 3GPP TSG-RAN WG1 Meeting #99, R1-1913203, Nov. 2019, 48 pages.

LG Electronics, "Text proposals on multi beam operation", 3GPP TSG RAN WG1 Meeting #100, R1-2000680, Feb. 2020, 12 pages.

"3rd Generation Partnership Project; Technical Specification Group Radio Access Network; NR; Physical channels and modulation (Release 16)", 3GPP TS 38.211 V16.1.0, Mar. 2020, 130 pages.

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)", 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

Extended European Search Report issued Jul. 15, 2024 regarding Application No. 22784966.8, 11 pages.

Qualcomm Incorporated, "Enhancements on Multi-beam Operation", 3GPP TSG RAN WG1 Meeting #100-Bis-e, R1-2002552, Apr. 2020, 8 pages.

* cited by examiner

METHOD AND APPARATUS FOR CHANNEL AND INTERFERENCE MEASUREMENT IN A WIRELESS COMMUNICATIONS SYSTEM

CROSS-REFERENCE TO RELATED APPLICATIONS AND CLAIM OF PRIORITY

The present application claims priority to U.S. Provisional Patent Application No. 63/171,351, filed on Apr. 6, 2021. The content of the above-identified patent documents are incorporated herein by reference.

TECHNICAL FIELD

The present disclosure relates generally to wireless communication systems and, more specifically, the present disclosure relates to channel and interference measurement in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to channel and interference measurement in a wireless communication system.

In one embodiment, a user equipment (UE) is provided. The UE includes a transceiver configured to receive a reporting setting; receive a resource setting associated with the reporting setting; receive, based on the resource setting, a first set of reference signals (RSs) through a first set of RS resources; and receive, based on the resource setting, a second set of RSs through a second set of RS resources. The reporting setting is configured with a higher layer parameter reportQuantity that is set to at least cri-SINR. The resource setting is configured with a higher layer parameter resourceType that is set to aperiodic, periodic, or semi-persistent. The UE further includes a processor operably coupled to the transceiver. The processor is configured to measure at least one RS in the first or second sets of RSs and determine, based on the reporting setting and the measured at least one RS, one or more layer-1 signal-to-noise and interference ratios (L1-SINRs).

In another embodiment, a base station (BS) is provided. The BS includes a transceiver configured to transmit a reporting setting; transmit a resource setting associated with the reporting setting; at least one of transmit, based on the resource setting, a first set of RSs through a first set of RS resources and transmit, based on the resource setting, a second set of RSs through a second set of RS resources; and receive information indicating one or more L1-SINRs based on the reporting setting and at least one RS in the first or second sets of RSs. The reporting setting is configured with a higher layer parameter reportQuantity that is set to at least cri-SINR. The resource setting is configured with a higher layer parameter resourceType that is set to aperiodic, periodic, or semi-persistent.

In yet another embodiment, a method for operating a UE is provided. The method includes receiving a reporting setting and receiving a resource setting associated with the reporting setting. The reporting setting is configured with a higher layer parameter reportQuantity that is set to at least cri-SINR. The resource setting is configured with a higher layer parameter resourceType that is set to aperiodic, periodic, or semi-persistent. The method further includes receiving, based on the resource setting, a first set of RSs through a first set of RS resources; receiving, based on the resource setting, a second set of RSs through a second set of RS resources; measuring at least one RS in the first or second sets of RSs; and determining, based on the reporting setting and the measured at least one RS, one or more L1-SINRs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; 3GPP TS 38.321 v16.1.0, "NR; Medium Access Control (MAC) protocol specification"; and 3GPP TS 38.331 v16.1.0, "NR; Radio Resource Control (RRC) Protocol Specification."

Figure 1:
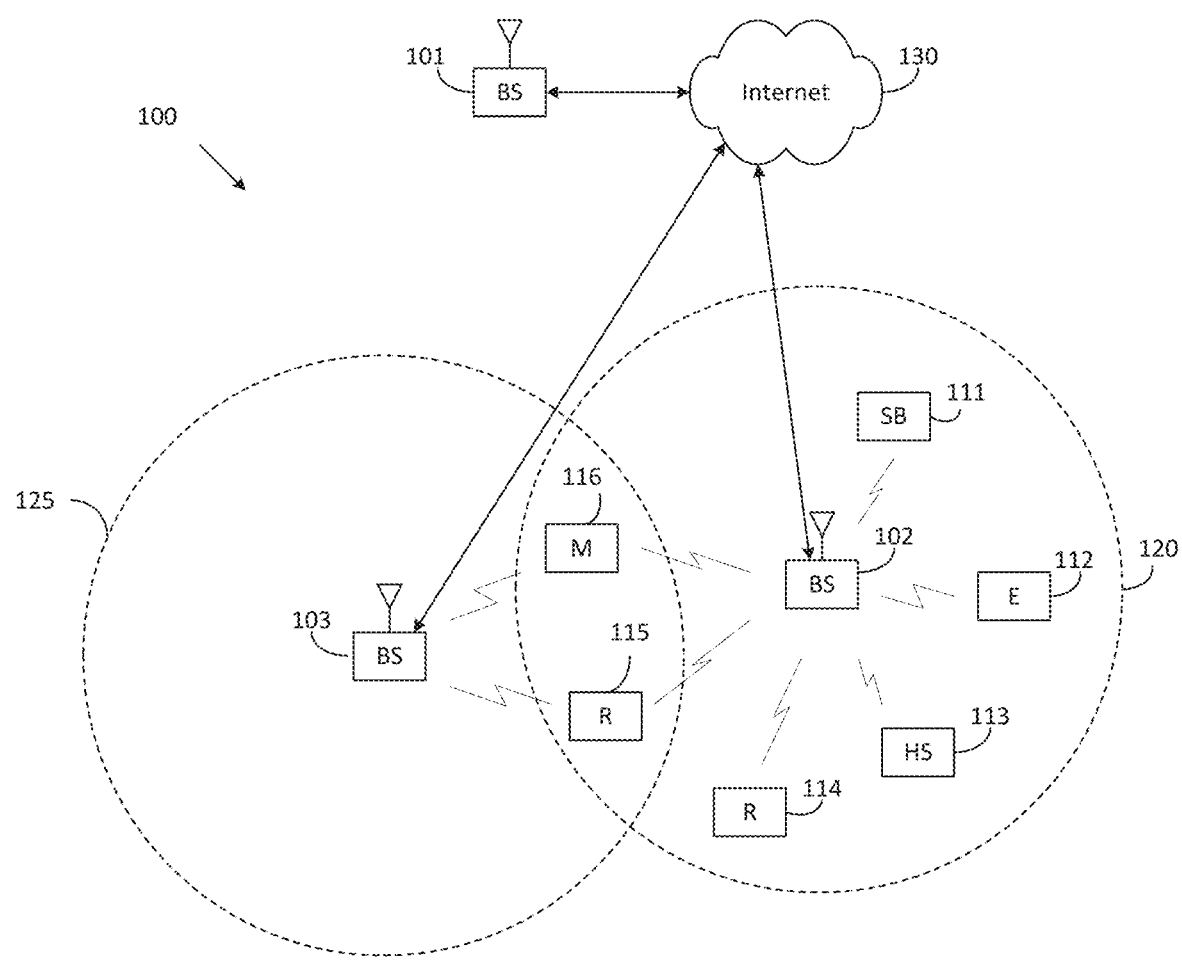
FIG. 1 illustrates an example of wireless network according to embodiments of the present disclosure.
Figure 2:
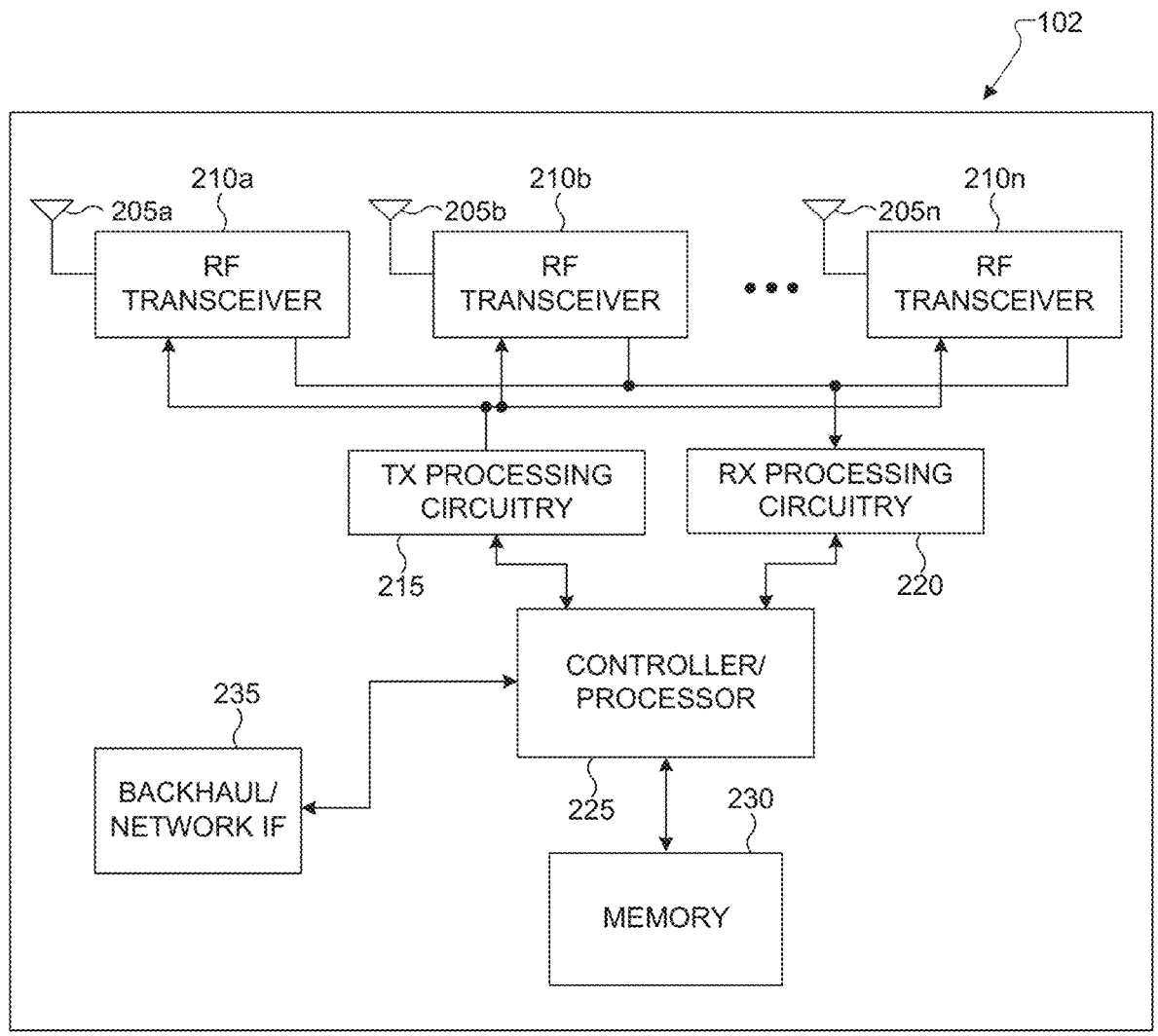
FIG. 2 illustrates an example of gNB according to embodiments of the present disclosure.
Figure 3:
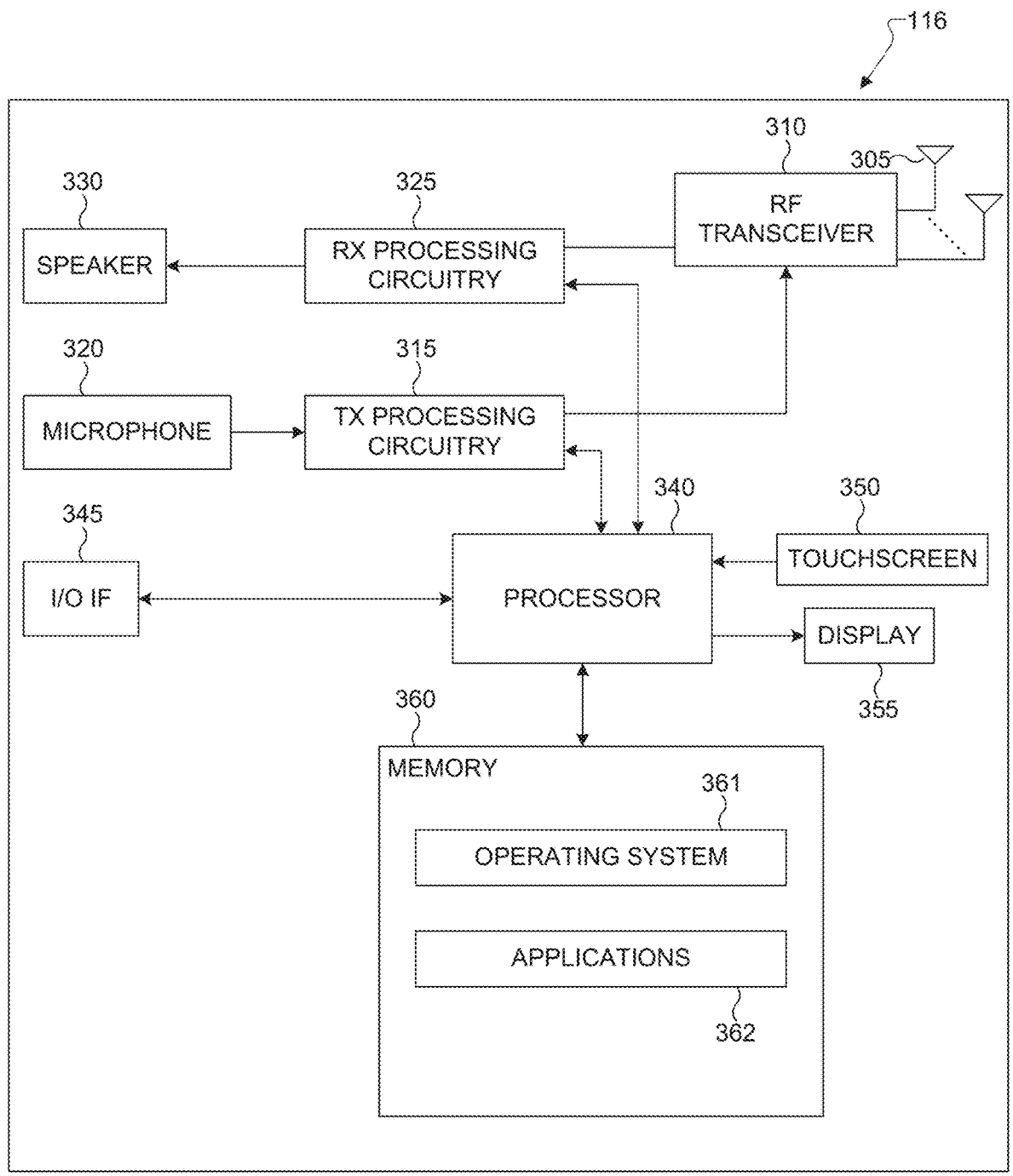
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), TRP, an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for channel and interference measurement in a wireless communication system. In certain embodiments, and one or more of the gNBs 101-103 includes circuitry, programing, or a combination thereof, for channel and interference measurement in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support channel and interference measurement in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for channel and interference measurement in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems, and to enable various vertical applications, 5G communication systems have been developed and are currently being deployed.

The 5G communication system is considered to be implemented to include higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. Aspects of the present disclosure may be applied to deployment of 5G communication systems, 6G or even later releases which may use THz bands. To decrease propagation loss of the radio waves and increase the transmission distance, the beamforming, massive multiple-input multiple-output (MIMO), Full Dimensional MIMO (FD-MIMO), array antenna, an analog beam forming, large-scale antenna techniques are discussed in 5G communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 30 KHz or 15 KHz, and so on.

Figure 4:
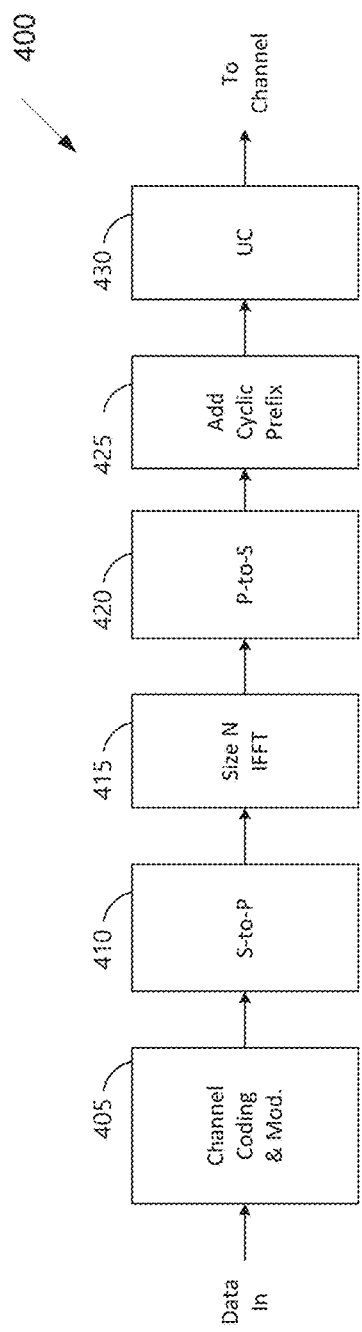
FIGS. 4 and 5 illustrate example of wireless transmit and receive paths according to this disclosure.
Figure 5:
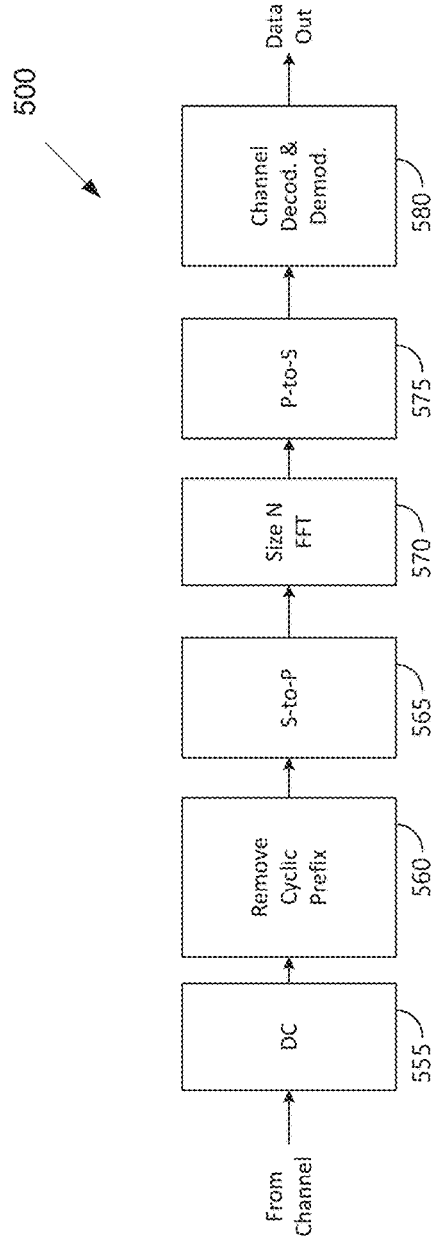

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6A:
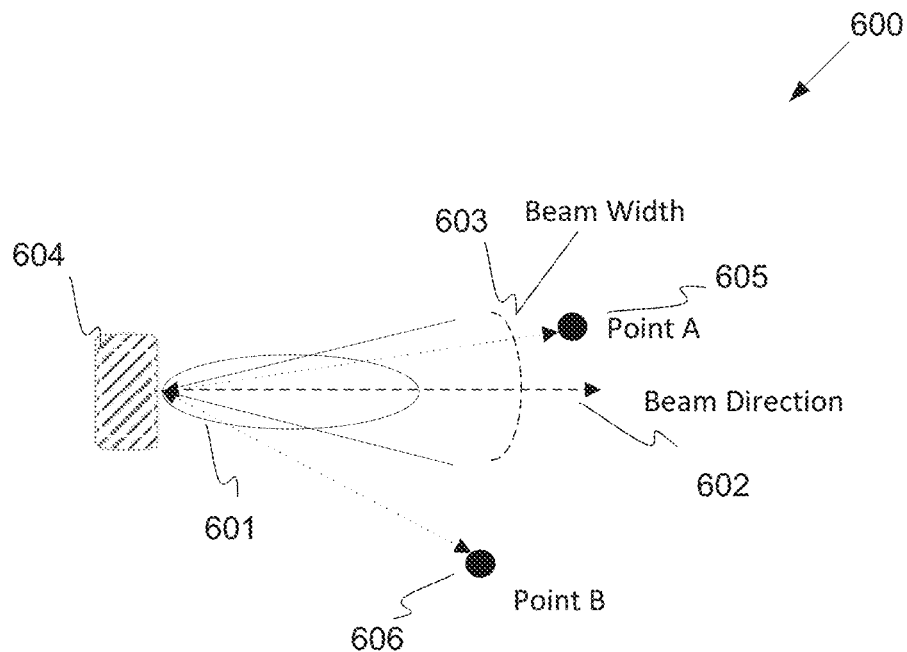
FIG. 6A illustrates an example of wireless system beam according to embodiments of the present disclosure.

FIG. 6A illustrates an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
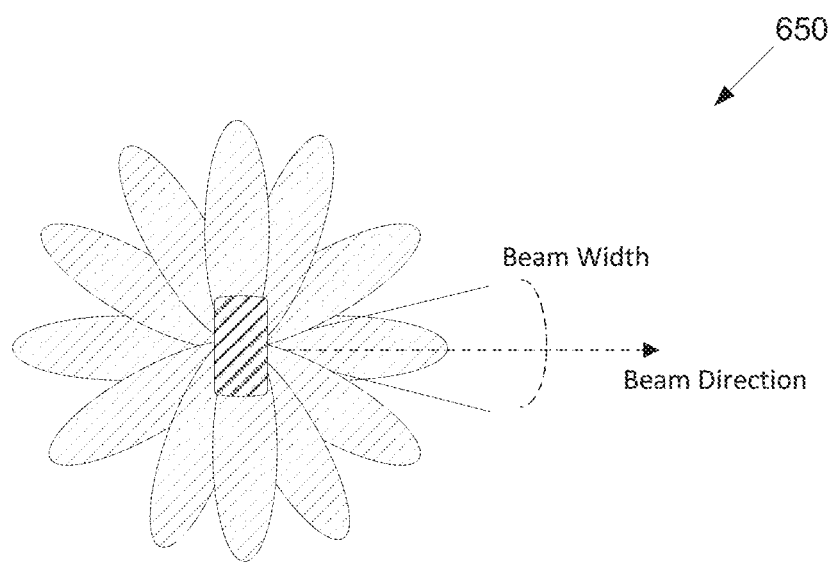
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Figure 7:
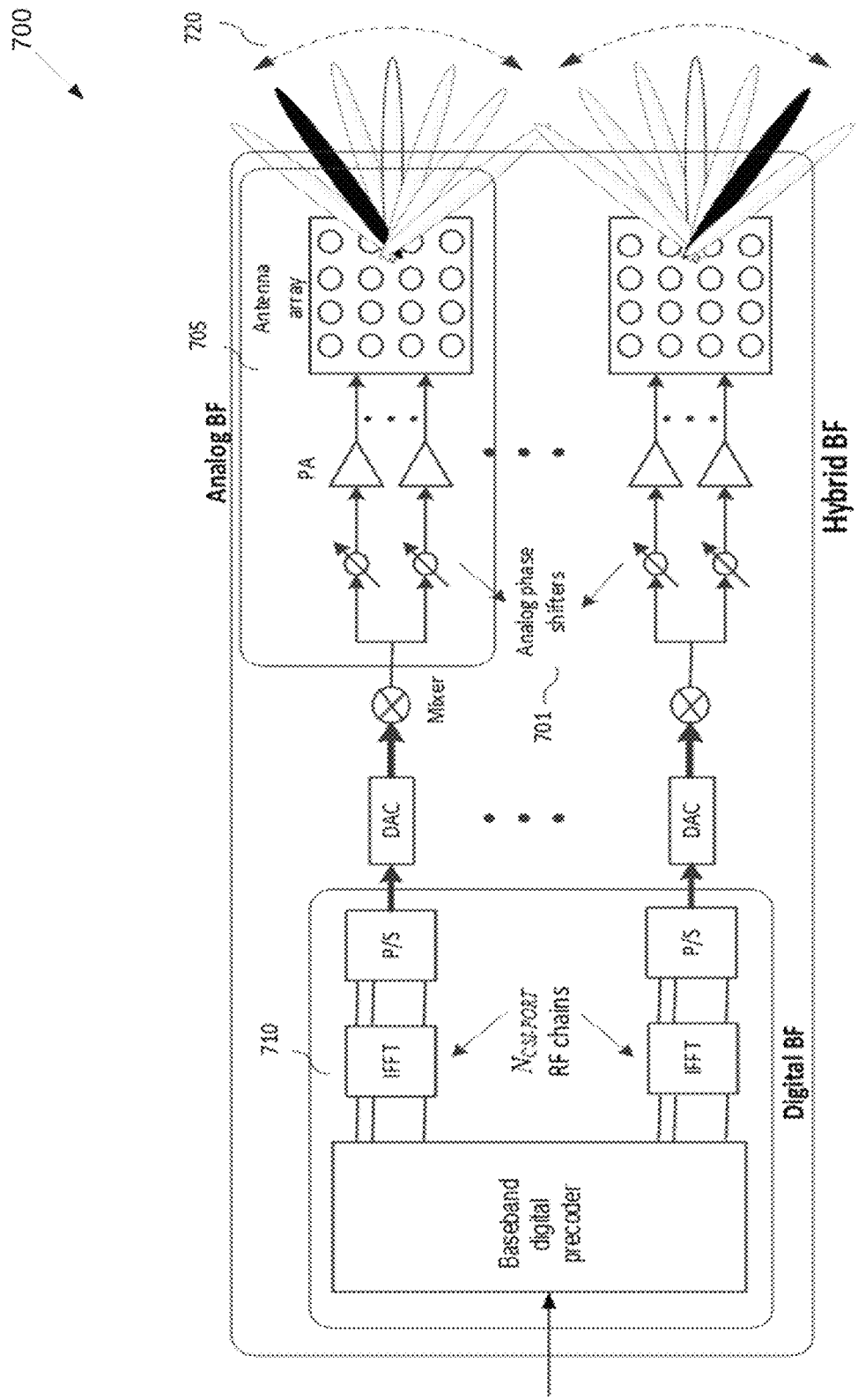
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

Rel-14 LTE and Rel-15 NR support up to 32 CSI-RS antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, which can correspond to the number of digitally precoded ports, can be limited due to hardware constraints (such as the feasibility to install a large number of ADCs/DACs at mmWave frequencies) as illustrated in FIG. 7. Then, one CSI-RS port can be mapped onto a large number of antenna elements that can be controlled by a bank of analog phase shifters 701. One CSI-RS port can then correspond to one sub-array which produces a narrow analog beam through analog beamforming 705. This analog beam can be configured to sweep across a wider range of angles (720) by varying the phase shifter bank across symbols or slots/subframes. The number of sub-arrays (equal to the number of RF chains) is same as the number of CSI-RS ports $N_{CSI\text{-}PORT}$. A digital beamforming unit 710 performs a linear combination across $N_{CSI\text{-}PORT}$ analog beams to further increase a precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams is selected out of a large number, for instance, after a training duration that is occasionally or periodically performed), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting," respectively), and receiving a DL or UL transmission via a selection of a corresponding receive (RX) beam.

The above system is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence larger number of radiators in the array) are needed to compensate for the additional path loss.

Figure 8:
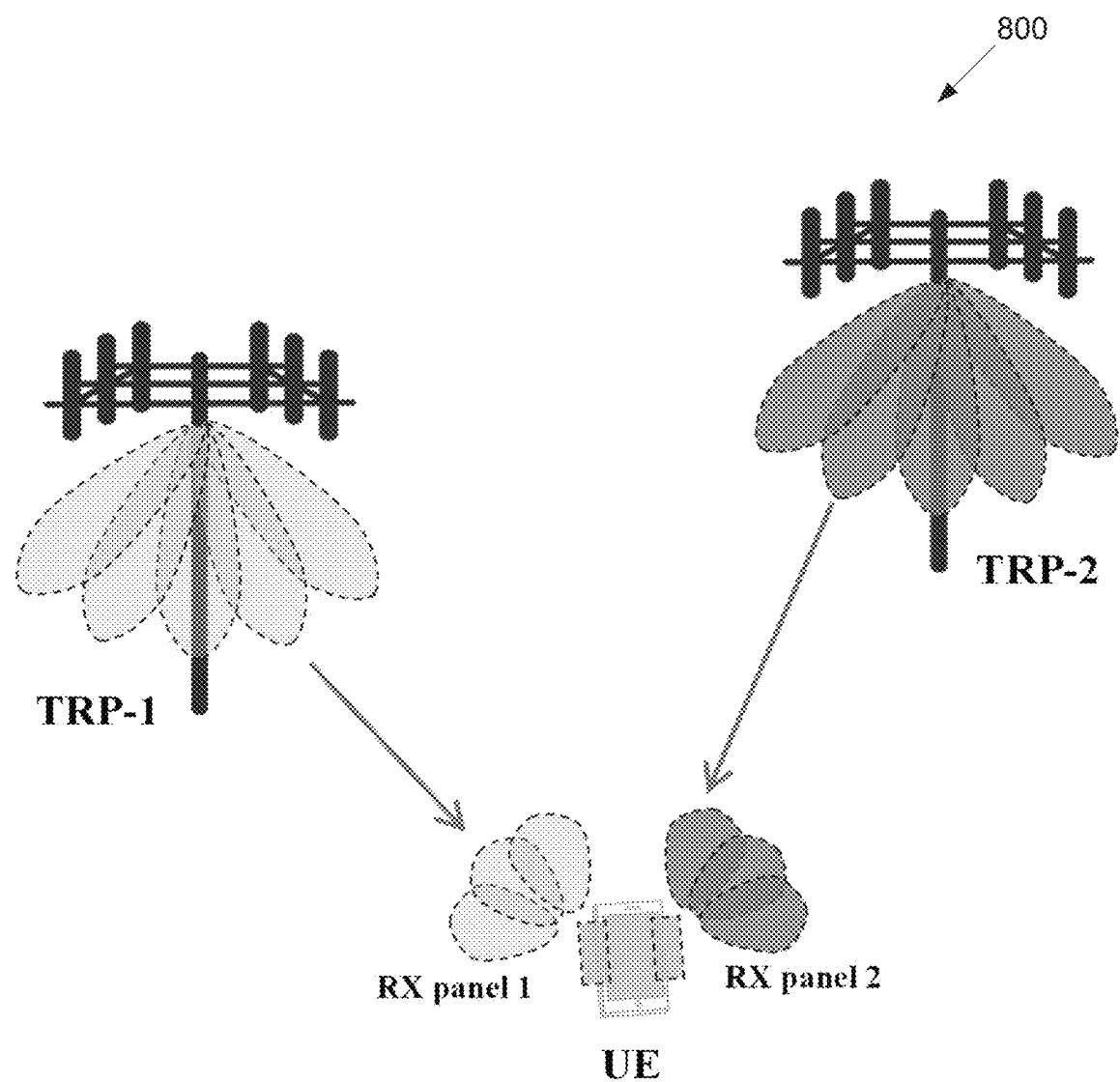
FIG. 8 illustrates an example of multi transmission and reception point (multi-TRP) operation according to embodiments of the present disclosure.

FIG. 8 illustrates an example of multi-TRP operation 800 according to embodiments of the present disclosure. An embodiment of the multi-TRP operation 000 shown in FIG. 8 is for illustration only.

In a multi-transmission and reception point (TRP) system shown in FIG. 8, the UE could simultaneously receive from multiple physically non-co-located TRPs various channels/RSs such as PDCCHs and/or PDSCHs using either a single receive (RX) panel or multiple RX panels.

In the present disclosure, a RX panel could correspond to a set of RX antenna elements/ports at the UE, a set of measurement RS resources such as SRS resources, a spatial domain RX filter or etc. Further, a TRP in the multi-TRP system can represent a collection of measurement antenna ports, measurement RS resources and/or control resource sets (CORESETs).

For example, a TRP could be associated with one or more of: (1) a plurality of CSI-RS resources; (2) a plurality of CRIs (CSI-RS resource indices/indicators); (3) a measurement RS resource set, for example, a CSI-RS resource set along with its indicator; (4) a plurality of CORESETs associated with a CORESETPoolIndex; and/or (5) a plurality of CORESETs associated with a TRP-specific index/indicator/identity.

To achieve better system performance such as throughput, coverage and etc. in the multi-TRP system, the UE may measure and report the interference between the TRPs in form of, e.g., L1-SINR. Further, the interference measurement for the multi-TRP operation may account for various CSI resource/reporting settings customized for the multi-TRP system. Necessary network/UE configuration/indication to better enable the signal/interference measurement/reporting for the multi-TRP operation also needs to be specified.

In the present disclosure, the UE could be higher layer configured/indicated by the network multiple CSI-RS resource subsets in a single CSI-RS resource set (and therefore in a single CSI resource setting) or/and multiple CSI-RS resource sets in a single CSI resource setting or/and multiple CSI resource settings for the multi-TRP operation. The signal and/or interference measurement settings such as the configurations of the channel measurement and the interference measurement resources for the multi-TRP operation are configured according to the specific CSI resource/reporting settings.

In one embodiment of 1.A, multiple CSI-RS resource subsets configured in a single CSI-RS resource set (in a single CSI resource setting) for multi-TRP operation are provided.

The UE could be higher layer configured by the network M=1 CSI resource setting (e.g., via the higher layer parameter CSI-ResourceConfig) for the multi-TRP operation, and the configured CSI resource setting could comprise of S=1 CSI-RS resource set (e.g., configured to the UE via the higher layer parameter CSI-SSB-ResourceSet/NZP-CSI-RS-ResourceSet). The CSI-RS resource set could comprise of at least two ($K_s \geq 2$) CSI-RS resources. The $K_s$ CSI-RS resources configured in the CSI-RS resource set could be divided into $M_s > 1$ CSI-RS resource subsets (denoted by the first CSI-RS resource subset, the second CSI-RS resource subset, . . . , and the $M_s$-th CSI-RS resource subset), each corresponding to/associated with a coordinating TRP in the multi-TRP system.

There could be various means to divide the total CSI-RS resources in the CSI-RS resource set into $M_s$ CSI-RS resource subsets. In general, the r-th (r=1, . . . , $M_s$) CSI-RS resource subset (e.g., with the r-th lowest/highest CSI-RS resource subset ID, denoted by NZP-CSI-RS-ResourceSubSetId/SSB-ResourceSubSetId) could comprise of $k_r$ CSI-RS resources; the CSI-RS resource set containing the $M_s$ CSI-RS resource subsets therefore has a total of $K_s = \Sigma_{r=1}^{M_s} k_r$ CSI-RS resources. The UE could be configured/indicated by the network the values of $k_1, k_2, \ldots, k_{M_s}$ via higher layer RRC or/and MAC CE or/and dynamic DCI based signaling. In one example, the values of $k_1, k_2, \ldots, k_{M_s}$ could be deterministic/fixed per RRC configuration and configured/indicated to the UE via higher layer RRC signaling (e.g., via higher layer parameter CSI-ResourceConfig).

For instance, for $M_s=2$ ($K_s=k_1+k_2$), $k_1$ could correspond to the first half of the CSI-RS resources in the CSI-RS resource set (i.e., $k_1=K_s/2$), and $k_2$ could correspond to the second half of the CSI-RS resources in the CSI-RS resource set ($k_2=K_s/2$).

In another example, the UE could be first higher layer configured/indicated by the network (e.g., via RRC signaling) one or more sets of candidate values of $k_1, k_2, \ldots, k_{M_s}$. The UE could then receive from the network one or more MAC CE command that activates/selects one set of values of $k_1, k_2, \ldots, k_{M_s}$ out of all sets of candidate values of $k_1, k_2, \ldots, k_{M_s}$. Yet in another example, the UE could be configured by the network the exact values of $k_1, k_2, \ldots, k_{M_s}$ via dynamic DCI indication. The $M_s$ CSI-RS resource subsets in the CSI-RS resource set could also form a list of CSI-RS resource subsets with $M_s$ entries (denoted by csi-RS-ResourceSubSetList), which could be configured to the UE, e.g., via the higher layer parameter CSI-ResourceConfig. Additional details about the association between the $M_s$ CSI-RS resource subsets in the CSI-RS resource set and the coordinating TRPs in the multi-TRP system may be found in U.S. patent application Ser. No. 17/452,981, filed Oct. 29, 2021, which is incorporated by reference herein, and the U.S. patent application Ser. No. 17/654,749 filed Mar. 14, 2022, which is incorporated by reference herein.

In one embodiment of 1.A.1, a single CSI reporting setting configured for multi-TRP operation is provided.

The UE could be higher layer configured by the network P=1 CSI reporting setting for the multi-TRP operation. The single CSI reporting setting is for all the coordinating TRPs in the multi-TRP system. The P=1 CSI reporting setting can include one CSI-report for all TRPs in the multi-TRP system or more than one (e.g., one CSI-report per TRP in the multi-TRP system) CSI-reports. Additional details about the association between the CSI-report(s) in the single CSI reporting setting and the coordinating TRPs in the multi-TRP system can be found in U.S. patent application Ser. No. 17/452,981 and U.S. patent application Ser. No. 17/654,749.

According to the 3GPP TS 38.214, in the configured CSI reporting setting (e.g., via the higher layer parameter CSI-ReportConfig), the UE could be configured a CSI resource setting (e.g., given by the higher layer parameter resourcesForChannelMeasurement) for channel measurement on NZP CSI-RS resource(s). As discussed above, in a given CSI resource setting (e.g., via the higher layer parameter CSI-ResourceConfig), a single CSI-RS resource set could be configured comprising of $M_s>1$ CSI-RS resource subsets for the coordinating TRPs in the multi-TRP system.

In one example, the UE could receive from the network a bitmap of length $M_s$, with each bit in the bitmap corresponding to a CSI-RS resource subset, to indicate the CSI-RS resource subset(s) (and therefore, the NZP CSI-RS resource(s) therein) for channel measurement. This indication could be via higher layer (RRC) or/and MAC CE or/and DCI based signaling or/and any combination of at least two of RRC, MAC CE and DCI based signaling; this indication could be via a separate (dedicated) parameter or joint with another parameter.

For instance, the UE may perform the channel measurement on the NZP CSI-RS resource(s) in one or more CSI-RS resource subsets whose bits/positions in the bitmap are configured as "1"s; if the bitmap contains all "1"s, the UE may perform the channel measurement on all the NZP CSI-RS resources configured in the CSI-RS resource set in the CSI resource setting configured for the multi-TRP operation. Under certain settings (e.g., configured/indicated by the network), the UE could also perform the interference measurement on the NZP CSI-RS resource(s) in one or more CSI-RS resource subsets whose bits/positions in the bitmap are configured as "0"s; if the bitmap contains all "0"s, the UE could perform the interference measurement on all the NZP CSI-RS resources configured in the CSI-RS resource set in the CSI resource setting configured for the multi-TRP operation.

In another example, the UE could receive from the network a MAC-CE command selecting/activating one or more CSI-RS resource subsets (and therefore, the NZP CSI-RS resources therein) for channel measurement. Under certain settings (e.g., configured/indicated by the network), the CSI-RS resource subset(s) (and therefore, the NZP CSI-RS resource(s) therein) not activated/selected via the MAC-CE command could be used by the UE for interference measurement. If the MAC-CE command activates all the $M_s$ CSI-RS resource subsets, the UE may perform the channel measurement on all the NZP CSI-RS resources configured in the CSI-RS resource set in the CSI resource setting configured for the multi-TRP operation.

In yet another example, the UE may perform the channel measurement on all the NZP CSI-RS resources configured in the CSI-RS resource set in the CSI resource setting regardless how they are divided into the $M_s$ CSI-RS resource subsets and/or how they are associated with different TRPs in the multi-TRP system, if the UE is configured to do so and/or if the UE does not receive any additional configuration/indication such as the bitmap and the MAC-CE activation command to indicate the CSI-RS resource subset(s) (and therefore, the NZP CSI-RS resource(s) therein) for channel measurement.

Other methods to indicate the CSI-RS resource subset(s) (and therefore, the NZP CSI-RS resource(s) therein) for channel measurement, e.g., any combination of at least two of the above described design examples, are also possible.

Further, the UE could be configured another CSI resource setting (e.g., given by the higher layer parameter nzp-CSI-RS-ResourcesetForInterference) for interference measurement performed on 1-port NZP CSI-RS resource(s) with density 3 REs/RB. As discussed above, in a given CSI resource setting (e.g., via the higher layer parameter CSI-ResourceConfig), a single CSI-RS resource set could be configured comprising of $M_s>1$ CSI-RS resource subsets for the coordinating TRPs in the multi-TRP system. Hence, for the configured CSI reporting setting with the higher layer parameter reportQuantity set to "cri-SINR" or "ssb-Index-SINR,"

In one example, the UE could receive from the network a bitmap of length $M_s$, with each bit in the bitmap corresponding to a CSI-RS resource subset, to indicate the CSI-RS resource subset(s) (and therefore, the NZP CSI-RS resource(s) therein) for interference measurement. This indication could be via higher layer (RRC) or/and MAC CE or/and DCI based signaling or/and any combination of at least two of RRC, MAC CE and DCI based signaling; this indication could be via a separate (dedicated) parameter or joint with another parameter. For instance, the UE may perform the interference measurement on the NZP CSI-RS resource(s) in one or more CSI-RS resource subsets whose bits/positions in the bitmap are configured as "1"s; if the bitmap contains all "1"s, the UE may perform the interference measurement on all the NZP CSI-RS resources configured in the CSI-RS resource set in the CSI resource setting configured for the multi-TRP operation. Under certain settings (e.g., configured/indicated by the network), the UE could also perform the channel measurement on the NZP CSI-RS resource(s) in one or more CSI-RS resource subsets whose bits/positions in the bitmap are configured as "0"s; if the bitmap contains all "0"s, the UE could perform the channel measurement on all the NZP CSI-RS resources configured in the CSI-RS resource set in the CSI resource setting configured for the multi-TRP operation.

In another example, the UE could receive from the network a MAC-CE command selecting/activating one or more CSI-RS resource subsets (and therefore, the NZP CSI-RS resources therein) for interference measurement. Under certain settings (e.g., configured/indicated by the network), the CSI-RS resource subset(s) (and therefore, the NZP CSI-RS resource(s) therein) not activated/selected via the MAC-CE command could be used by the UE for channel measurement. If the MAC-CE command activates all the $M_s$ CSI-RS resource subsets, the UE may perform the interference measurement on all the NZP CSI-RS resources configured in the CSI-RS resource set in the CSI resource setting configured for the multi-TRP operation.

In yet another example, the UE may perform the interference measurement on all the NZP CSI-RS resources configured in the CSI-RS resource set in the CSI resource setting regardless how they are divided into the $M_s$ CSI-RS resource subsets and/or how they are associated with different TRPs in the multi-TRP system, if the UE is configured to do so and/or if the UE does not receive any additional configuration/indication such as the bitmap and the MAC-CE activation command to indicate the CSI-RS resource subset(s) (and therefore, the NZP CSI-RS resource(s) therein) for interference measurement.

Other methods to indicate the CSI-RS resource subset(s) (and therefore, the NZP CSI-RS resource(s) therein) for interference measurement, e.g., any combination of at least two of the above described design examples, are also possible.

When NZP CSI-RS resource(s) is used for interference measurement, the UE may assume that the NZP CSI-RS resource for channel measurement and the NZP CSI-RS resource(s) for interference measurement configured in the same CSI reporting setting (e.g., via the higher layer parameter CSI-ReportConfig) are QCL'ed with respect to "typeD." Each NZP CSI-RS resource for channel measurement is associated with one NZP CSI-RS resource for interference measurement by the ordering of the NZP CSI-RS resource for channel measurement and NZP CSI-RS resource for interference measurement in the corresponding CSI-RS resource sets. The number of CSI-RS resources for channel measurement equals to the number of NZP CSI-RS resource for interference measurement.

In one embodiment of 1.A.2, multiple CSI reporting settings configured for multi-TRP operation are provided.

The UE could be higher layer configured by the network P>1 CSI reporting settings for the multi-TRP operation, which could be regarded/labelled as the first CSI reporting setting, the second CSI reporting setting, and so on, and the P-th CSI reporting setting. For example, the first CSI reporting setting could have the lowest CSI reporting setting ID value (e.g., the higher layer parameter CSI-ReportConfigId), the second CSI reporting setting could have the second lowest CSI reporting setting ID value, and so on, and the P-th CSI reporting setting could have the highest CSI reporting setting ID value (other association/mapping relationships between the ordering of the CSI reporting settings and the CSI reporting setting ID values are also possible); each CSI reporting setting could be associated with one or more TRPs in the multi-TRP system. A single TRP in the multi-TRP system could be associated with a single CSI reporting setting.

Additional details about the association between the P>1 CSI reporting settings and the coordinating TRPs in the multi-TRP system may be found in U.S. patent application Ser. No. 17/452,981 and U.S. patent application Ser. No. 17/654,749.

According to the 3GPP TS 38.214, in a configured CSI reporting setting (e.g., via the higher layer parameter CSI-ReportConfig), the UE could be configured a CSI resource setting (e.g., given by the higher layer parameter resourcesForChannelMeasurement) for channel measurement on NZP CSI-RS resource(s). As discussed above, in a given CSI resource setting (e.g., via the higher layer parameter CSI-ResourceConfig), a single CSI-RS resource set could be configured comprising of $M_s$>1 CSI-RS resource subsets for the coordinating TRPs in the multi-TRP system. As more than one CSI reporting settings (P>1) are configured here for the multi-TRP operation, a given CSI reporting setting could be associated with a subset (e.g., one) of all the $M_s$ CSI-RS resource subsets configured in the CSI-RS resource set in the CSI resource setting, and each CSI-RS resource subset configured in the CSI-RS resource set in the CSI resource setting is associated with a CSI reporting setting.

Additional details about the association between the $M_s$>1 CSI-RS resource subsets and the P CSI reporting settings may be found in U.S. patent application Ser. No. 17/452,981 and U.S. patent application Ser. No. 17/654,749.

Assume that the configured CSI reporting setting #K is associated with $M_k$ CSI-RS resource subset(s) (1≤$M_k$≤$M_s$), in one example, the UE could receive from the network a bitmap of length $M_k$, with each bit in the bitmap corresponding to a CSI-RS resource subset associated with the CSI reporting setting #K, to indicate the CSI-RS resource subset(s) (and therefore, the NZP CSI-RS resource(s) therein) for channel measurement. This indication could be via higher layer (RRC) or/and MAC CE or/and DCI based signaling or/and any combination of at least two of RRC, MAC CE and DCI based signaling; this indication could be via a separate (dedicated) parameter or joint with another parameter. For instance, the UE may perform the channel measurement on the NZP CSI-RS resource(s) in one or more CSI-RS resource subsets associated with the CSI reporting setting #K whose bits/positions in the bitmap are configured as "1"s; if the bitmap contains all "1"s, the UE may perform the channel measurement on all the NZP CSI-RS resources configured in the $M_k$ CSI-RS resource subsets in the CSI-RS resource set in the CSI resource setting. Under certain settings (e.g., configured/indicated by the network), the UE could also perform the interference measurement on the NZP CSI-RS resource(s) in one or more CSI-RS resource subsets associated with the CSI reporting setting #K whose bits/positions in the bitmap are configured as "0"s; if the bitmap contains all "0"s, the UE could perform the interference measurement on all the NZP CSI-RS resources configured in the $M_k$ CSI-RS resource subsets in the CSI-RS resource set in the CSI resource setting configured for the multi-TRP operation.

Assume that the configured CSI reporting setting #K is associated with $M_k$ CSI-RS resource subset(s) (1≤$M_k$≤$M_s$), in another example, the UE could receive from the network a MAC-CE command selecting/activating one or more CSI-RS resource subsets (and therefore, the NZP CSI-RS resources therein) associated with the CSI reporting setting #K for channel measurement. Under certain settings (e.g., configured/indicated by the network), the CSI-RS resource subset(s) associated with the CSI reporting setting #K (and therefore, the NZP CSI-RS resource(s) therein) not activated/selected via the MAC-CE command could be used by the UE for interference measurement. If the MAC-CE command activates all the $M_k$ CSI-RS resource subsets, the UE may perform the channel measurement on all the NZP CSI-RS resources configured in the $M_k$ CSI-RS resource subsets in the CSI-RS resource set in the CSI resource setting configured for the multi-TRP operation.

Assume that the configured CSI reporting setting #K is associated with $M_k$ CSI-RS resource subset(s) (1≤$M_k$≤$M_s$), in yet another example, the UE may perform the channel measurement on all the NZP CSI-RS resources configured in the $M_k$ CSI-RS resource subsets in the CSI-RS resource set in the CSI resource setting regardless how they are associated with different TRPs in the multi-TRP system, if the UE is configured to do so and/or if the UE does not receive any additional configuration/indication such as the bitmap and the MAC-CE activation command to indicate the CSI-RS resource subset(s) (and therefore, the NZP CSI-RS resource(s) therein) associated with the CSI reporting setting #K for channel measurement.

Other methods to indicate the CSI-RS resource subset(s) (and therefore, the NZP CSI-RS resource(s) therein) associated with a CSI reporting setting for channel measurement, e.g., any combination of at least two of the above described design examples, are also possible.

Further, the UE could be configured another CSI resource setting (e.g., given by the higher layer parameter nzp-CSI-RS-ResourcesetForInterference) for interference measurement performed on 1-port NZP CSI-RS resource(s) with density 3 REs/RB. As discussed above, in a given CSI resource setting (e.g., via the higher layer parameter CSI-ResourceConfig), a single CSI-RS resource set could be configured comprising of $M_s>1$ CSI-RS resource subsets for the coordinating TRPs in the multi-TRP system. As more than one CSI reporting settings (P>1) are configured here for the multi-TRP operation, a given CSI reporting setting could be associated with a subset (e.g., one) of all the $M_s$ CSI-RS resource subsets configured in the CSI-RS resource set in the CSI resource setting, and each CSI-RS resource subset configured in the CSI-RS resource set in the CSI resource setting is associated with a CSI reporting setting.

Additional details about the association between the $M_s>1$ CSI-RS resource subsets and the P CSI reporting settings may be found in U.S. patent application Ser. No. 17/452,981 and U.S. patent application Ser. No. 17/654,749.

Assume that the configured CSI reporting setting #L with the higher layer parameter reportQuantity set to "cri-SINR" or "ssb-Index-SINR" is associated with $M_1$ CSI-RS resource subset(s) ($1 \leq M_1 \leq M_s$), in one example, the UE could receive from the network a bitmap of length $M_1$, with each bit in the bitmap corresponding to a CSI-RS resource subset associated with the CSI reporting setting #L, to indicate the CSI-RS resource subset(s) (and therefore, the NZP CSI-RS resource(s) therein) for interference measurement. This indication could be via higher layer (RRC) or/and MAC CE or/and DCI based signaling or/and any combination of at least two of RRC, MAC CE and DCI based signaling; this indication could be via a separate (dedicated) parameter or joint with another parameter. For instance, the UE may perform the interference measurement on the NZP CSI-RS resource(s) in one or more CSI-RS resource subsets associated with the CSI reporting setting #L whose bits/positions in the bitmap are configured as "1"s; if the bitmap contains all "1"s, the UE may perform the interference measurement on all the NZP CSI-RS resources configured in the $M_1$ CSI-RS resource subsets in the CSI-RS resource set in the CSI resource setting configured for the multi-TRP operation. Under certain settings (e.g., configured/indicated by the network), the UE could also perform the channel measurement on the NZP CSI-RS resource(s) in one or more CSI-RS resource subsets associated with the CSI reporting setting #L whose bits/positions in the bitmap are configured as "0"s; if the bitmap contains all "0"s, the UE could perform the channel measurement on all the NZP CSI-RS resources configured in the $M_1$ CSI-RS resource subsets in the CSI-RS resource set in the CSI resource setting configured for the multi-TRP operation.

Assume that the configured CSI reporting setting #L with the higher layer parameter reportQuantity set to "cri-SINR" or "ssb-Index-SINR" is associated with $M_1$ CSI-RS resource subset(s) ($1 \leq M_1 \leq M_s$), in another example, the UE could receive from the network a MAC-CE command selecting/activating one or more CSI-RS resource subsets (and therefore, the NZP CSI-RS resources therein) associated with the CSI reporting setting #L for interference measurement. Under certain settings (e.g., configured/indicated by the network), the CSI-RS resource subset(s) associated with the CSI reporting setting #L (and therefore, the NZP CSI-RS resource(s) therein) not activated/selected via the MAC-CE command could be used by the UE for channel measurement. If the MAC-CE command activates all the $M_1$ CSI-RS resource subsets, the UE may perform the interference measurement on all the NZP CSI-RS resources configured in the $M_1$ CSI-RS resource subsets in the CSI-RS resource set in the CSI resource setting configured for the multi-TRP operation.

Assume that the configured CSI reporting setting #L with the higher layer parameter reportQuantity set to "cri-SINR" or "ssb-Index-SINR" is associated with $M_1$ CSI-RS resource subset(s) ($1 \leq M_1 \leq M_s$), in yet another example, the UE may perform the interference measurement on all the NZP CSI-RS resources configured in the $M_1$ CSI-RS resource subsets in the CSI-RS resource set in the CSI resource setting regardless how they are associated with different TRPs in the multi-TRP system, if the UE is configured to do so and/or if the UE does not receive any additional configuration/indication such as the bitmap and the MAC-CE activation command to indicate the CSI-RS resource subset(s) (and therefore, the NZP CSI-RS resource(s) therein) associated with the CSI reporting setting #L for interference measurement.

Other methods to indicate the CSI-RS resource subset(s) (and therefore, the NZP CSI-RS resource(s) therein) associated with a CSI reporting setting for interference measurement, e.g., any combination of at least two of the above described design examples, are also possible.

When NZP CSI-RS resource(s) is used for interference measurement, the UE may assume that the NZP CSI-RS resource for channel measurement and the NZP CSI-RS resource(s) for interference measurement configured in the same or across different CSI reporting setting(s) (e.g., via the higher layer parameter CSI-ReportConfig(s)) are QCL'ed with respect to "typeD." Each NZP CSI-RS resource for channel measurement is associated with one NZP CSI-RS resource for interference measurement by the ordering of the NZP CSI-RS resource for channel measurement and NZP CSI-RS resource for interference measurement in the corresponding CSI-RS resource sets. The number of CSI-RS resources for channel measurement equals to the number of NZP CSI-RS resource for interference measurement.

In one embodiment of 1.B, multiple CSI-RS resource sets configured in a single CSI resource setting for multi-TRP operation are provided.

The UE could be higher layer configured by the network (e.g., via the higher layer parameter CSI-ResourceConfig) M=1 CSI resource setting for the multi-TRP operation. In the configured CSI resource setting, the UE could be higher layer configured by the network S>1 CSI-RS resource sets (e.g., via the higher layer parameter CSI-SSB-ResourceSet/NZP-CSI-RS-ResourceSet, denoted by the first CSI-RS resource set, the second CSI-RS resource set, . . . , and the S-th CSI-RS resource set), each corresponding to/associated with a coordinating TRP in the multi-TRP system. Additional details about the association between the S>1 CSI-RS resource sets and the coordinating TRPs in the multi-TRP system may be found in U.S. patent application Ser. No. 17/452,981 and U.S. patent application Ser. No. 17/654,749.

In one embodiment of 1.B.1, a single CSI reporting setting configured for multi-TRP operation is provided.

The UE could be higher layer configured by the network P=1 CSI reporting setting for the multi-TRP operation. The single CSI reporting setting is for all the coordinating TRPs in the multi-TRP system. The P=1 CSI reporting setting can include one CSI-report for all TRPs in the multi-TRP system or more than one (e.g., one CSI-report per TRP in the multi-TRP system) CSI-reports. Additional details about the association between the CSI-report(s) in the single CSI reporting setting and the coordinating TRPs in the multi-TRP system may be found in U.S. patent application Ser. No. 17/452,981 and U.S. patent application Ser. No. 17/654,749.

According to the 3GPP TS 38.214, in the configured CSI reporting setting (e.g., via the higher layer parameter CSI-ReportConfig), the UE could be configured a CSI resource setting (e.g., given by the higher layer parameter resourcesForChannelMeasurement) for channel measurement on NZP CSI-RS resource(s). As discussed above, in a given CSI resource setting (e.g., via the higher layer parameter CSI-ResourceConfig), more than one (S>1) CSI-RS resource sets could be configured for the coordinating TRPs in the multi-TRP system.

In one example, the UE could receive from the network a bitmap of length S, with each bit in the bitmap corresponding to a CSI-RS resource set, to indicate the CSI-RS resource set(s) (and therefore, the NZP CSI-RS resource(s) therein) for channel measurement. This indication could be via higher layer (RRC) or/and MAC CE or/and DCI based signaling or/and any combination of at least two of RRC, MAC CE and DCI based signaling; this indication could be via a separate (dedicated) parameter or joint with another parameter. For instance, the UE may perform the channel measurement on the NZP CSI-RS resource(s) in one or more CSI-RS resource sets configured for the multi-TRP operation whose bits/positions in the bitmap are configured as "1"s; if the bitmap contains all "1"s, the UE may perform the channel measurement on all the NZP CSI-RS resources configured in the S CSI-RS resource sets in the CSI resource setting configured for the multi-TRP operation. Under certain settings (e.g., configured/indicated by the network), the UE could also perform the interference measurement on the NZP CSI-RS resource(s) in one or more CSI-RS resource sets configured for the multi-TRP operation whose bits/positions in the bitmap are configured as "0"s; if the bitmap contains all "0"s, the UE could perform the interference measurement on all the NZP CSI-RS resources configured in the S CSI-RS resource sets in the CSI resource setting configured for the multi-TRP operation.

In another example, the UE could receive from the network a MAC-CE command selecting/activating one or more CSI-RS resource sets (and therefore, the NZP CSI-RS resources therein) for channel measurement. Under certain settings (e.g., configured/indicated by the network), the CSI-RS resource set(s) (and therefore, the NZP CSI-RS resource(s) therein) not activated/selected via the MAC-CE command could be used by the UE for interference measurement. If the MAC-CE command activates all the S CSI-RS resource sets configured in the CSI resource setting for the multi-TRP operation, the UE may perform the channel measurement on all the NZP CSI-RS resources configured in the S CSI-RS resource sets in the CSI resource setting configured for the multi-TRP operation.

In yet another example, the UE may perform the channel measurement on all the NZP CSI-RS resources configured in the S>1 CSI-RS resource sets in the CSI resource setting regardless how they are associated with different TRPs in the multi-TRP system, if the UE is configured to do so and/or if the UE does not receive any additional configuration/indication such as the bitmap and the MAC-CE activation command to indicate the CSI-RS resource set(s) (and therefore, the NZP CSI-RS resource(s) therein) for channel measurement.

Other methods to indicate the CSI-RS resource set(s) (and therefore, the NZP CSI-RS resource(s) therein) for channel measurement, e.g., any combination of at least two of the above described design examples, are also possible.

Further, the UE could be configured another CSI resource setting (e.g., given by the higher layer parameter nzp-CSI-RS-ResourcesetForInterference) for interference measurement performed on 1-port NZP CSI-RS resource(s) with density 3 REs/RB. As discussed above, in a given CSI resource setting (e.g., via the higher layer parameter CSI-ResourceConfig), more than one (S>1) CSI-RS resource sets could be configured for the coordinating TRPs in the multi-TRP system.

Hence, for the configured CSI reporting setting with the higher layer parameter reportQuantity set to "cri-SINR" or "ssb-Index-SINR," in one example, the UE could receive from the network a bitmap of length S, with each bit in the bitmap corresponding to a CSI-RS resource set, to indicate the CSI-RS resource set(s) (and therefore, the NZP CSI-RS resource(s) therein) for interference measurement. This indication could be via higher layer (RRC) or/and MAC CE or/and DCI based signaling or/and any combination of at least two of RRC, MAC CE and DCI based signaling; this indication could be via a separate (dedicated) parameter or joint with another parameter. For instance, the UE may perform the interference measurement on the NZP CSI-RS resource(s) in one or more CSI-RS resource sets configured for the multi-TRP operation whose bits/positions in the bitmap are configured as "1"s; if the bitmap contains all "1"s, the UE may perform the interference measurement on all the NZP CSI-RS resources configured in the S CSI-RS resource sets in the CSI resource setting configured for the multi-TRP operation. Under certain settings (e.g., configured/indicated by the network), the UE could also perform the channel measurement on the NZP CSI-RS resource(s) in one or more CSI-RS resource sets configured for the multi-TRP operation whose bits/positions in the bitmap are configured as "0"s; if the bitmap contains all "0"s, the UE could perform the channel measurement on all the NZP CSI-RS resources configured in the S CSI-RS resource sets in the CSI resource setting configured for the multi-TRP operation.

For the configured CSI reporting setting with the higher layer parameter reportQuantity set to "cri-SINR" or "ssb-Index-SINR," in another example, the UE could receive from the network a MAC-CE command selecting/activating one or more CSI-RS resource sets (and therefore, the NZP CSI-RS resources therein) for interference measurement. Under certain settings (e.g., configured/indicated by the network), the CSI-RS resource set(s) (and therefore, the NZP CSI-RS resource(s) therein) not activated/selected via the MAC-CE command could be used by the UE for channel measurement. If the MAC-CE command activates all the S CSI-RS resource sets configured in the CSI resource setting for the multi-TRP operation, the UE may perform the interference measurement on all the NZP CSI-RS resources configured in the S CSI-RS resource sets in the CSI resource setting configured for the multi-TRP operation.

For the configured CSI reporting setting with the higher layer parameter reportQuantity set to "cri-SINR" or "ssb-Index-SINR," in yet another example, the UE may perform the interference measurement on all the NZP CSI-RS resources configured in the S>1 CSI-RS resource sets in the CSI resource setting regardless how they are associated with different TRPs in the multi-TRP system, if the UE is configured to do so and/or if the UE does not receive any additional configuration/indication such as the bitmap and the MAC-CE activation command to indicate the CSI-RS resource set(s) (and therefore, the NZP CSI-RS resource(s) therein) for interference measurement.

Other methods to indicate the CSI-RS resource set(s) (and therefore, the NZP CSI-RS resource(s) therein) for interference measurement, e.g., any combination of at least two of the above described design examples, are also possible.

When NZP CSI-RS resource(s) is used for interference measurement, the UE may assume that the NZP CSI-RS resource for channel measurement and the NZP CSI-RS resource(s) for interference measurement configured in the same CSI reporting setting (e.g., via the higher layer parameter CSI-ReportConfig) are QCL'ed with respect to "typeD." Each NZP CSI-RS resource for channel measurement is associated with one NZP CSI-RS resource for interference measurement by the ordering of the NZP CSI-RS resource for channel measurement and NZP CSI-RS resource for interference measurement in the corresponding CSI-RS resource sets. The number of CSI-RS resources for channel measurement equals to the number of NZP CSI-RS resource for interference measurement.

In one embodiment of 1.B.2, multiple CSI reporting settings configured for multi-TRP operation are provided.

The UE could be higher layer configured by the network P>1 CSI reporting settings for the multi-TRP operation, which could be regarded/labelled as the first CSI reporting setting, the second CSI reporting setting, and so on, and the P-th CSI reporting setting. For example, the first CSI reporting setting could have the lowest CSI reporting setting ID value (e.g., higher layer parameter CSI-ReportConfigId), the second CSI reporting setting could have the second lowest CSI reporting setting ID value, and so on, and the P-th CSI reporting setting could have the highest CSI reporting setting ID value (other association/mapping relationships between the ordering of the CSI reporting settings and the CSI reporting setting ID values are also possible); each CSI reporting setting could be associated with one or more TRPs in the multi-TRP system. A single TRP in the multi-TRP system could be associated with a single CSI reporting setting. Additional details about the association between the P>1 CSI reporting settings and the coordinating TRPs in the multi-TRP system may be found in U.S. patent application Ser. No. 17/452,981 and U.S. patent application Ser. No. 17/654,749.

According to the 3GPP TS 38.214, in a configured CSI reporting setting (e.g., via the higher layer parameter CSI-ReportConfig), the UE could be configured a CSI resource setting (e.g., given by the higher layer parameter resourcesForChannelMeasurement) for channel measurement on NZP CSI-RS resource(s). As discussed above, in a given CSI resource setting (e.g., via the higher layer parameter CSI-ResourceConfig), more than one (S>1) CSI-RS resource sets could be configured for the coordinating TRPs in the multi-TRP system. As more than one CSI reporting settings (P>1) are configured here for the multi-TRP operation, a given CSI reporting setting could be associated with a subset (e.g., one) of all the S CSI-RS resource sets configured in the CSI resource setting for the multi-TRP operation, and each CSI-RS resource set configured in the CSI resource setting for the multi-TRP operation is associated with a CSI reporting setting.

Additional details about the association between the S>1 CSI-RS resource sets configured in the CSI resource setting for the multi-TRP operation and the P CSI reporting settings may be found in U.S. patent application Ser. No. 17/452,981 and U.S. patent application Ser. No. 17/654,749.

Assume that the configured CSI reporting setting #I is associated with $S_i$ CSI-RS resource set(s) ($1 \leq S_i \leq S$), in one example, the UE could receive from the network a bitmap of length $S_i$, with each bit in the bitmap corresponding to a CSI-RS resource set associated with the CSI reporting setting #I, to indicate the CSI-RS resource set(s) (and therefore, the NZP CSI-RS resource(s) therein) for channel measurement. This indication could be via higher layer (RRC) or/and MAC CE or/and DCI based signaling or/and any combination of at least two of RRC, MAC CE and DCI based signaling; this indication could be via a separate (dedicated) parameter or joint with another parameter. For instance, the UE may perform the channel measurement on the NZP CSI-RS resource(s) in one or more CSI-RS resource sets associated with the CSI reporting setting #I whose bits/positions in the bitmap are configured as "1"s; if the bitmap contains all "1"s, the UE may perform the channel measurement on all the NZP CSI-RS resources configured in the $S_i$ CSI-RS resource sets in the CSI resource setting configured for the multi-TRP operation. Under certain settings (e.g., configured/indicated by the network), the UE could also perform the interference measurement on the NZP CSI-RS resource(s) in one or more CSI-RS resource sets associated with the CSI reporting setting #I whose bits/positions in the bitmap are configured as "0"s; if the bitmap contains all "0"s, the UE could perform the interference measurement on all the NZP CSI-RS resources configured in the $S_i$ CSI-RS resource sets in the CSI resource setting configured for the multi-TRP operation.

Assume that the configured CSI reporting setting #I is associated with $S_i$ CSI-RS resource set(s) ($1 \leq S_i \leq S$), in another example, the UE could receive from the network a MAC-CE command selecting/activating one or more CSI-RS resource sets (and therefore, the NZP CSI-RS resources therein) associated with the CSI reporting setting #I for channel measurement. Under certain settings (e.g., configured/indicated by the network), the CSI-RS resource set(s) associated with the CSI reporting setting #I (and therefore, the NZP CSI-RS resource(s) therein) not activated/selected via the MAC-CE command could be used by the UE for interference measurement. If the MAC-CE command activates all the $S_i$ CSI-RS resource sets, the UE may perform the channel measurement on all the NZP CSI-RS resources configured in the $S_i$ CSI-RS resource sets in the CSI resource setting configured for the multi-TRP operation.

Assume that the configured CSI reporting setting #I is associated with $S_i$ CSI-RS resource set(s) ($1 \leq S_i \leq S$), in yet another example, the UE may perform the channel measurement on all the NZP CSI-RS resources configured in the $S_i$ CSI-RS resource sets in the CSI resource setting regardless how they are associated with different TRPs in the multi-TRP system, if the UE is configured to do so and/or if the UE does not receive any additional configuration/indication such as the bitmap and the MAC-CE activation command to indicate the CSI-RS resource set(s) (and therefore, the NZP CSI-RS resource(s) therein) associated with the CSI reporting setting #I for channel measurement.

Other methods to indicate the CSI-RS resource set(s) (and therefore, the NZP CSI-RS resource(s) therein) associated with a CSI reporting setting for channel measurement, e.g., any combination of at least two of the above described design examples, are also possible.

Further, the UE could be configured another CSI resource setting (e.g., given by the higher layer parameter nzp-CSI-RS-ResourcesetForInterference) for interference measurement performed on 1-port NZP CSI-RS resource(s) with density 3 REs/RB. As discussed above, in a given CSI resource setting (e.g., via the higher layer parameter CSI-ResourceConfig), more than one (S>1) CSI-RS resource sets could be configured for the coordinating TRPs in the multi-TRP system. As more than one CSI reporting settings (P>1) are configured here for the multi-TRP operation, a given CSI reporting setting could be associated with a subset (e.g., one) of all the S CSI-RS resource sets configured in the CSI resource setting for the multi-TRP operation, and each CSI-RS resource set configured in the CSI resource setting for the multi-TRP operation is associated with a CSI reporting setting. Additional details about the association between the S>1 CSI-RS resource sets configured in the CSI resource setting for the multi-TRP operation and the P CSI reporting settings may be found in U.S. patent application Ser. No. 17/452,981 and U.S. patent application Ser. No. 17/654,749.

Assume that the configured CSI reporting setting #J with the higher layer parameter reportQuantity set to "cri-SINR" or "ssb-Index-SINR" is associated with $S_j$ CSI-RS resource set(s) ($1 \leq S_j \leq S$), in one example, the UE could receive from the network a bitmap of length $S_j$, with each bit in the bitmap corresponding to a CSI-RS resource set associated with the CSI reporting setting #J, to indicate the CSI-RS resource set(s) (and therefore, the NZP CSI-RS resource(s) therein) for interference measurement. This indication could be via higher layer (RRC) or/and MAC CE or/and DCI based signaling or/and any combination of at least two of RRC, MAC CE and DCI based signaling; this indication could be via a separate (dedicated) parameter or joint with another parameter. For instance, the UE may perform the interference measurement on the NZP CSI-RS resource(s) in one or more CSI-RS resource sets associated with the CSI reporting setting #J whose bits/positions in the bitmap are configured as "1"s; if the bitmap contains all "1"s, the UE may perform the interference measurement on all the NZP CSI-RS resources configured in the $S_j$ CSI-RS resource sets in the CSI resource setting configured for the multi-TRP operation. Under certain settings (e.g., configured/indicated by the network), the UE could also perform the channel measurement on the NZP CSI-RS resource(s) in one or more CSI-RS resource sets associated with the CSI reporting setting #J whose bits/positions in the bitmap are configured as "0"s; if the bitmap contains all "0"s, the UE could perform the channel measurement on all the NZP CSI-RS resources configured in the $S_j$ CSI-RS resource sets in the CSI resource setting configured for the multi-TRP operation.

Assume that the configured CSI reporting setting #J with the higher layer parameter reportQuantity set to "cri-SINR" or "ssb-Index-SINR" is associated with $S_j$ CSI-RS resource set(s) ($1 \leq S_j \leq S$), in another example, the UE could receive from the network a MAC-CE command selecting/activating one or more CSI-RS resource sets (and therefore, the NZP CSI-RS resources therein) associated with the CSI reporting setting #J for interference measurement. Under certain settings (e.g., configured/indicated by the network), the CSI-RS resource set(s) associated with the CSI reporting setting #J (and therefore, the NZP CSI-RS resource(s) therein) not activated/selected via the MAC-CE command could be used by the UE for channel measurement. If the MAC-CE command activates all the $S_j$ CSI-RS resource sets, the UE may perform the interference measurement on all the NZP CSI-RS resources configured in the $S_j$ CSI-RS resource sets in the CSI resource setting configured for the multi-TRP operation.

Assume that the configured CSI reporting setting #J with the higher layer parameter reportQuantity set to "cri-SINR" or "ssb-Index-SINR" is associated with $S_j$ CSI-RS resource set(s) ($1 \leq S_j \leq S$), in yet another example, the UE may perform the interference measurement on all the NZP CSI-RS resources configured in the $S_j$ CSI-RS resource sets in the CSI resource setting regardless how they are associated with different TRPs in the multi-TRP system, if the UE is configured to do so and/or if the UE does not receive any additional configuration/indication such as the bitmap and the MAC-CE activation command to indicate the CSI-RS resource set(s) (and therefore, the NZP CSI-RS resource(s) therein) associated with the CSI reporting setting #J for interference measurement.

Other methods to indicate the CSI-RS resource set(s) (and therefore, the NZP CSI-RS resource(s) therein) associated with a CSI reporting setting for interference measurement, e.g., any combination of at least two of the above described design examples, are also possible.

When NZP CSI-RS resource(s) is used for interference measurement, the UE may assume that the NZP CSI-RS resource for channel measurement and the NZP CSI-RS resource(s) for interference measurement configured in the same or across different CSI reporting setting(s) (e.g., via the higher layer parameter CSI-ReportConfig(s)) are QCL'ed with respect to "typeD." Each NZP CSI-RS resource for channel measurement is associated with one NZP CSI-RS resource for interference measurement by the ordering of the NZP CSI-RS resource for channel measurement and NZP CSI-RS resource for interference measurement in the corresponding CSI-RS resource sets. The number of CSI-RS resources for channel measurement equals to the number of NZP CSI-RS resource for interference measurement.

In one embodiment of 1.C, multiple CSI resource settings configured for multi-TRP operation are provided.

The UE could be higher layer configured by the network (e.g., via the higher layer parameter CSI-ResourceConfig) M>1 CSI resource settings for the multi-TRP operation with at least one (S=1) CSI-RS resource set per CSI resource setting, and each CSI resource setting is associated with/corresponds to a coordinating TRP in the multi-TRP system; the M>1 CSI resource settings configured for the multi-TRP operation could be denoted by the first CSI resource setting, the second CSI resource setting, . . . , and the M-th CSI resource setting. Additional details about the association between the M>1 CSI resource settings and the coordinating TRPs in the multi-TRP system may be found in U.S. patent application Ser. No. 17/452,981 and U.S. patent application Ser. No. 17/654,749.

In one embodiment of 1.C.1, a single CSI reporting setting configured for multi-TRP operation is provided.

The UE could be higher layer configured by the network P=1 CSI reporting setting for the multi-TRP operation. The single CSI reporting setting is for all the coordinating TRPs in the multi-TRP system. The P=1 CSI reporting setting can include one CSI-report for all TRPs in the multi-TRP system or more than one (e.g., one CSI-report per TRP in the multi-TRP system) CSI-reports. Additional details about the association between the CSI-report(s) in the single CSI reporting setting and the coordinating TRPs in the multi-TRP system may be found in U.S. patent application Ser. No. 17/452,981 and U.S. patent application Ser. No. 17/654,749.

In the configured CSI reporting setting (e.g., via the higher layer parameter CSI-ReportConfig), the UE could be configured a list of (at least one) CSI resource settings (e.g., given by the higher layer parameter resourcesForChannelMeasurement) for channel measurement on NZP CSI-RS resource(s).

As discussed above, more than one (M>1) CSI resource settings could be configured for the coordinating TRPs in the multi-TRP system.

In one example, the UE could receive from the network a bitmap of length M, with each bit in the bitmap corresponding to a CSI resource setting configured for the multi-TRP operation, to indicate the CSI resource setting(s) (and therefore, the NZP CSI-RS resource(s) therein) for channel measurement. This indication could be via higher layer (RRC) or/and MAC CE or/and DCI based signaling or/and any combination of at least two of RRC, MAC CE and DCI based signaling; this indication could be via a separate (dedicated) parameter or joint with another parameter. For instance, the UE may perform the channel measurement on the NZP CSI-RS resource(s) in one or more CSI resource settings configured for the multi-TRP operation whose bits/positions in the bitmap are configured as "1"s; if the bitmap contains all "1"s, the UE may perform the channel measurement on all the NZP CSI-RS resources configured in the M CSI resource settings configured for the multi-TRP operation. Under certain settings (e.g., configured/indicated by the network), the UE could also perform the interference measurement on the NZP CSI-RS resource(s) in one or more CSI resource settings configured for the multi-TRP operation whose bits/positions in the bitmap are configured as "0"s; if the bitmap contains all "0"s, the UE could perform the interference measurement on all the NZP CSI-RS resources configured in the M CSI resource settings configured for the multi-TRP operation.

In another example, the UE could receive from the network a MAC-CE command selecting/activating one or more CSI resource settings (and therefore, the NZP CSI-RS resources therein) for channel measurement. Under certain settings (e.g., configured/indicated by the network), the CSI resource setting(s) configured for the multi-TRP operation (and therefore, the NZP CSI-RS resource(s) therein) not activated/selected via the MAC-CE command could be used by the UE for interference measurement. If the MAC-CE command activates all the M CSI resource settings configured for the multi-TRP operation, the UE may perform the channel measurement on all the NZP CSI-RS resources configured in the M CSI resource settings for the multi-TRP operation.

In yet another example, the UE may perform the channel measurement on all the NZP CSI-RS resources configured in the M>1 CSI resource settings for the multi-TRP operation regardless how they are associated with different TRPs in the multi-TRP system, if the UE is configured to do so and/or if the UE does not receive any additional configuration/indication such as the bitmap and the MAC-CE activation command to indicate the CSI resource setting(s) (and therefore, the NZP CSI-RS resource(s) therein) for channel measurement.

Other methods to indicate the CSI resource setting(s) (and therefore, the NZP CSI-RS resource(s) therein) for channel measurement, e.g., any combination of at least two of the above described design examples, are also possible.

Further, the UE could be configured another list of (at least one) CSI resource settings (e.g., given by the higher layer parameter nzp-CSI-RS-ResourcesetForInterference) for interference measurement performed on 1-port NZP CSI-RS resource(s) with density 3 REs/RB. As discussed above, more than one (M>1) CSI resource settings could be configured for the coordinating TRPs in the multi-TRP system.

Hence, for the configured CSI reporting setting with the higher layer parameter reportQuantity set to "cri-SINR" or "ssb-Index-SINR," in one example, the UE could receive from the network a bitmap of length M, with each bit in the bitmap corresponding to a CSI resource setting configured for the multi-TRP operation, to indicate the CSI resource setting(s) (and therefore, the NZP CSI-RS resource(s) therein) for interference measurement. This indication could be via higher layer (RRC) or/and MAC CE or/and DCI based signaling or/and any combination of at least two of RRC, MAC CE and DCI based signaling; this indication could be via a separate (dedicated) parameter or joint with another parameter. For instance, the UE may perform the interference measurement on the NZP CSI-RS resource(s) in one or more CSI resource settings configured for the multi-TRP operation whose bits/positions in the bitmap are configured as "1"s; if the bitmap contains all "1"s, the UE may perform the interference measurement on all the NZP CSI-RS resources configured in the M CSI resource settings for the multi-TRP operation. Under certain settings (e.g., configured/indicated by the network), the UE could also perform the channel measurement on the NZP CSI-RS resource(s) in one or more CSI resource settings configured for the multi-TRP operation whose bits/positions in the bitmap are configured as "0"s; if the bitmap contains all "0"s, the UE could perform the channel measurement on all the NZP CSI-RS resources configured in the M CSI resource settings configured for the multi-TRP operation.

For the configured CSI reporting setting with the higher layer parameter reportQuantity set to "cri-SINR" or "ssb-Index-SINR," in another example, the UE could receive from the network a MAC-CE command selecting/activating one or more CSI resource settings (and therefore, the NZP CSI-RS resources therein) for interference measurement. Under certain settings (e.g., configured/indicated by the network), the CSI resource setting(s) configured for the multi-TRP operation (and therefore, the NZP CSI-RS resource(s) therein) not activated/selected via the MAC-CE command could be used by the UE for channel measurement. If the MAC-CE command activates all the M CSI resource settings configured for the multi-TRP operation, the UE may perform the interference measurement on all the NZP CSI-RS resources configured in the M CSI resource settings configured for the multi-TRP operation.

For the configured CSI reporting setting with the higher layer parameter reportQuantity set to "cri-SINR" or "ssb-Index-SINR," in yet another example, the UE may perform the interference measurement on all the NZP CSI-RS resources configured in the M>1 CSI resource settings regardless how they are associated with different TRPs in the multi-TRP system, if the UE is configured to do so and/or if the UE does not receive any additional configuration/indication such as the bitmap and the MAC-CE activation command to indicate the CSI resource setting(s) (and therefore, the NZP CSI-RS resource(s) therein) for interference measurement.

Other methods to indicate the CSI resource setting(s) (and therefore, the NZP CSI-RS resource(s) therein) for interference measurement, e.g., any combination of at least two of the above described design examples, are also possible.

When NZP CSI-RS resource(s) is used for interference measurement, the UE may assume that the NZP CSI-RS resource for channel measurement and the NZP CSI-RS resource(s) for interference measurement configured in the same CSI reporting setting (e.g., via the higher layer parameter CSI-ReportConfig) are QCL'ed with respect to "typeD." Each NZP CSI-RS resource for channel measurement is associated with one NZP CSI-RS resource for interference measurement by the ordering of the NZP CSI-RS resource for channel measurement and NZP CSI-RS resource for interference measurement in the corresponding CSI-RS resource sets. The number of CSI-RS resources for channel measurement equals to the number of NZP CSI-RS resource for interference measurement.

In one embodiment of 1.C.2, multiple CSI reporting settings for multi-TRP operation are provided.

The UE could be higher layer configured by the network P>1 CSI reporting settings for the multi-TRP operation, which could be regarded/labelled as the first CSI reporting setting, the second CSI reporting setting, and so on, and the P-th CSI reporting setting. For example, the first CSI reporting setting could have the lowest CSI reporting setting ID value (e.g., higher layer parameter CSI-ReportConfigId), the second CSI reporting setting could have the second lowest CSI reporting setting ID value, and so on, and the P-th CSI reporting setting could have the highest CSI reporting setting ID value (other association/mapping relationships between the ordering of the CSI reporting settings and the CSI reporting setting ID values are also possible); each CSI reporting setting could be associated with one or more TRPs in the multi-TRP system. A single TRP in the multi-TRP system could be associated with a single CSI reporting setting.

Additional details about the association between the P>1 CSI reporting settings and the coordinating TRPs in the multi-TRP system may be found in U.S. patent application Ser. No. 17/452,981 and U.S. patent application Ser. No. 17/654,749.

In a configured CSI reporting setting (e.g., via the higher layer parameter CSI-ReportConfig), the UE could be configured a list of (at least one) CSI resource settings (e.g., given by the higher layer parameter resourcesForChannelMeasurement) for channel measurement on NZP CSI-RS resource(s). As discussed above, more than one (M>1) CSI resource settings could be configured for the coordinating TRPs in the multi-TRP system. As more than one CSI reporting settings (P>1) are configured here for the multi-TRP operation, a given CSI reporting setting could be associated with a subset (e.g., one) of all the M CSI resource settings configured for the multi-TRP operation, and each CSI resource setting configured for the multi-TRP operation is associated with a CSI reporting setting.

Additional details about the association between the M>1 CSI resource settings configured for the multi-TRP operation and the P CSI reporting settings may be found in U.S. patent application Ser. No. 17/452,981 and U.S. patent application Ser. No. 17/654,749.

Assume that the configured CSI reporting setting #U is associated with $M_u$ CSI resource setting(s) ($1 \leq M_u \leq M$), in one example, the UE could receive from the network a bitmap of length $M_u$, with each bit in the bitmap corresponding to a CSI resource setting associated with the CSI reporting setting #U, to indicate the CSI resource setting(s) (and therefore, the NZP CSI-RS resource(s) therein) for channel measurement. This indication could be via higher layer (RRC) or/and MAC CE or/and DCI based signaling or/and any combination of at least two of RRC, MAC CE and DCI based signaling; this indication could be via a separate (dedicated) parameter or joint with another parameter. For instance, the UE may perform the channel measurement on the NZP CSI-RS resource(s) configured in one or more CSI resource settings associated with the CSI reporting setting #U whose bits/positions in the bitmap are configured as "1"s; if the bitmap contains all "1"s, the UE may perform the channel measurement on all the NZP CSI-RS resources configured in the $M_u$ CSI resource settings configured for the multi-TRP operation. Under certain settings (e.g., configured/indicated by the network), the UE could also perform the interference measurement on the NZP CSI-RS resource(s) in one or more CSI resource settings associated with the CSI reporting setting #U whose bits/positions in the bitmap are configured as "0"s; if the bitmap contains all "0"s, the UE could perform the interference measurement on all the NZP CSI-RS resources configured in the $M_u$ CSI resource settings configured for the multi-TRP operation.

Assume that the configured CSI reporting setting #U is associated with $M_u$ CSI resource setting(s) ($1 \leq M_u \leq M$), in another example, the UE could receive from the network a MAC-CE command selecting/activating one or more CSI resource settings (and therefore, the NZP CSI-RS resources therein) associated with the CSI reporting setting #U for channel measurement. Under certain settings (e.g., configured/indicated by the network), the CSI resource setting(s) associated with the CSI reporting setting #U (and therefore, the NZP CSI-RS resource(s) therein) not activated/selected via the MAC-CE command could be used by the UE for interference measurement. If the MAC-CE command activates all the $M_u$ CSI resource settings, the UE may perform the channel measurement on all the NZP CSI-RS resources configured in the $M_u$ CSI resource settings configured for the multi-TRP operation.

Assume that the configured CSI reporting setting #U is associated with $M_u$ CSI resource setting(s) ($1 \leq M_u \leq M$), in yet another example, the UE may perform the channel measurement on all the NZP CSI-RS resources configured in the $M_u$ CSI resource settings regardless how they are associated with different TRPs in the multi-TRP system, if the UE is configured to do so and/or if the UE does not receive any additional configuration/indication such as the bitmap and the MAC-CE activation command to indicate the CSI resource setting(s) (and therefore, the NZP CSI-RS resource(s) therein) associated with the CSI reporting setting #U for channel measurement.

Other methods to indicate the CSI resource setting(s) (and therefore, the NZP CSI-RS resource(s) therein) associated with a CSI reporting setting for channel measurement, e.g., any combination of at least two of the above described design examples, are also possible.

Further, the UE could be configured another list of (at least one) CSI resource settings (e.g., given by the higher layer parameter nzp-CSI-RS-ResourcesetForInterference) for interference measurement performed on 1-port NZP CSI-RS resource(s) with density 3 REs/RB. As discussed above, more than one (M>1) CSI resource settings could be configured for the coordinating TRPs in the multi-TRP system. As more than one CSI reporting settings (P>1) are configured here for the multi-TRP operation, a given CSI reporting setting could be associated with a subset (e.g., one) of all the M CSI resource settings configured for the multi-TRP operation, and each CSI resource setting configured for the multi-TRP operation is associated with a CSI reporting setting.

Additional details about the association between the M>1 CSI resource settings configured for the multi-TRP operation and the P CSI reporting settings may be found in U.S. patent application Ser. No. 17/452,981 and U.S. patent application Ser. No. 17/654,749.

Assume that the configured CSI reporting setting #V with the higher layer parameter reportQuantity set to "cri-SINR" or "ssb-Index-SINR" is associated with $M_v$ CSI resource setting(s) ($1 \leq M_v \leq M$), in one example, the UE could receive from the network a bitmap of length $M_v$, with each bit in the bitmap corresponding to a CSI resource setting associated with the CSI reporting setting #V, to indicate the CSI resource setting(s) (and therefore, the NZP CSI-RS resource(s) therein) for interference measurement. This indication could be via higher layer (RRC) or/and MAC CE or/and DCI based signaling or/and any combination of at least two of RRC, MAC CE and DCI based signaling; this indication could be via a separate (dedicated) parameter or joint with another parameter. For instance, the UE may perform the interference measurement on the NZP CSI-RS resource(s) in one or more CSI resource settings associated with the CSI reporting setting #V whose bits/positions in the bitmap are configured as "1"s; if the bitmap contains all "1"s, the UE may perform the interference measurement on all the NZP CSI-RS resources configured in the $M_v$ CSI resource settings configured for the multi-TRP operation. Under certain settings (e.g., configured/indicated by the network), the UE could also perform the channel measurement on the NZP CSI-RS resource(s) in one or more CSI resource settings associated with the CSI reporting setting #V whose bits/positions in the bitmap are configured as "0"s; if the bitmap contains all "0"s, the UE could perform the channel measurement on all the NZP CSI-RS resources configured in the $M_v$ CSI resource settings configured for the multi-TRP operation.

Assume that the configured CSI reporting setting #V with the higher layer parameter reportQuantity set to "cri-SINR" or "ssb-Index-SINR" is associated with $M_v$ CSI resource setting(s) ($1 \leq M_v \leq M$), in another example, the UE could receive from the network a MAC-CE command selecting/activating one or more CSI resource settings (and therefore, the NZP CSI-RS resources therein) associated with the CSI reporting setting #V for interference measurement. Under certain settings (e.g., configured/indicated by the network), the CSI resource setting(s) associated with the CSI reporting setting #V (and therefore, the NZP CSI-RS resource(s) therein) not activated/selected via the MAC-CE command could be used by the UE for channel measurement. If the MAC-CE command activates all the $M_v$ CSI resource settings, the UE may perform the interference measurement on all the NZP CSI-RS resources configured in the $M_v$ CSI resource settings configured for the multi-TRP operation.

Assume that the configured CSI reporting setting #V with the higher layer parameter reportQuantity set to "cri-SINR" or "ssb-Index-SINR" is associated with $M_v$ CSI resource setting(s) ($1 \leq M_v \leq M$), in yet another example, the UE may perform the interference measurement on all the NZP CSI-RS resources configured in the $M_v$ CSI resource settings regardless how they are associated with different TRPs in the multi-TRP system, if the UE is configured to do so and/or if the UE does not receive any additional configuration/indication such as the bitmap and the MAC-CE activation command to indicate the CSI resource setting(s) (and therefore, the NZP CSI-RS resource(s) therein) associated with the CSI reporting setting #V for interference measurement.

Other methods to indicate the CSI resource setting(s) (and therefore, the NZP CSI-RS resource(s) therein) associated with a CSI reporting setting for interference measurement, e.g., any combination of at least two of the above described design examples, are also possible.

When NZP CSI-RS resource(s) is used for interference measurement, the UE may assume that the NZP CSI-RS resource for channel measurement and the NZP CSI-RS resource(s) for interference measurement configured in the same or across different CSI reporting setting(s) (e.g., via the higher layer parameter CSI-ReportConfig(s)) are QCL'ed with respect to "typeD." Each NZP CSI-RS resource for channel measurement is associated with one NZP CSI-RS resource for interference measurement by the ordering of the NZP CSI-RS resource for channel measurement and NZP CSI-RS resource for interference measurement in the corresponding CSI-RS resource sets. The number of CSI-RS resources for channel measurement equals to the number of NZP CSI-RS resource for interference measurement.

In one embodiment of 2.A, multiple CSI-IM resource subsets configured in a single CSI-IM resource set (in a single CSI resource setting) for multi-TRP operation are provided.

The UE could be higher layer configured by the network M=1 CSI resource setting (e.g., via the higher layer parameter CSI-ResourceConfig) for the multi-TRP operation, and the configured CSI resource setting could comprise of S'=1 CSI-IM resource set (e.g., configured to the UE via the higher layer parameter CSI-IM-ResourceSet). The CSI-IM resource set could comprise of at least two ($G_s \geq 2$) CSI-IM resources. The $G_s$ CSI-IM resources configured in the CSI-IM resource set could be divided into $T_s > 1$ CSI-IM resource subsets (denoted by the first CSI-IM resource subset, the second CSI-IM resource subset, . . . , and the $T_s$-th CSI-IM resource subset), each corresponding to/associated with a coordinating TRP in the multi-TRP system. The details about partitioning the $G_s$ CSI-IM resources into the $T_s$ CSI-IM resource subsets could follow those discussed in part 1.A in this disclosure regarding partitioning the $K_s$ CSI-RS resources into the $M_s$ CSI-RS resource subsets.

Additional details about the association between the $T_s$ CSI-IM resource subsets in the CSI-IM resource set and the coordinating TRPs in the multi-TRP system may be found in U.S. patent application Ser. No. 17/452,981 and U.S. patent application Ser. No. 17/654,749, for the association between the $M_s$ CSI-RS resource subsets in the CSI-RS resource set and the coordinating TRPs in the multi-TRP system.

In one embodiment of 2.A.1, a single CSI reporting setting configured for multi-TRP operation is provided.

The UE could be higher layer configured by the network P=1 CSI reporting setting for the multi-TRP operation. The single CSI reporting setting is for all the coordinating TRPs in the multi-TRP system. The P=1 CSI reporting setting can include one CSI-report for all TRPs in the multi-TRP system or more than one (e.g., one CSI-report per TRP in the multi-TRP system) CSI-reports. Additional details about the association between the CSI-report(s) in the single CSI reporting setting and the coordinating TRPs in the multi-TRP system may be found in U.S. patent application Ser. No. 17/452,981 and U.S. patent application Ser. No. 17/654,749.

According to the 3GPP TS 38.214, in the configured CSI reporting setting (e.g., via the higher layer parameter CSI-ReportConfig), the UE could be configured a CSI resource setting (e.g., given by the higher layer parameter resourcesForChannelMeasurement) for channel measurement on NZP CSI-RS resource(s). As discussed in part 1.A in this disclosure, in a given CSI resource setting (e.g., via the higher layer parameter CSI-ResourceConfig), a single CSI-RS resource set could be configured comprising of $M_s > 1$ CSI-RS resource subsets for the coordinating TRPs in the multi-TRP system. There are various means to indicate the CSI-RS resource subset(s) (and therefore, the NZP CSI-RS resource(s) therein) for channel measurement such as the bitmap and the MAC-CE activation based strategies discussed in part 1.A in this disclosure.

Further, the UE could be configured another CSI resource setting (e.g., given by the higher layer parameter csi-IM-ResourcesForInterference) for interference measurement performed on the CSI-IM resource(s). As discussed above, in a given CSI resource setting (e.g., via the higher layer parameter CSI-ResourceConfig), a single CSI-IM resource set could be configured comprising of $T_s > 1$ CSI-IM resource subsets for the coordinating TRPs in the multi-TRP system.

Hence, for the configured CSI reporting setting with the higher layer parameter reportQuantity set to "cri-SINR" or "ssb-Index-SINR," in one example, the UE could receive from the network a bitmap of length $T_s$, with each bit in the bitmap corresponding to a CSI-IM resource subset, to indicate the CSI-IM resource subset(s) (and therefore, the CSI-IM resource(s) therein) for interference measurement. This indication could be via higher layer (RRC) or/and MAC CE or/and DCI based signaling or/and any combination of at least two of RRC, MAC CE and DCI based signaling; this indication could be via a separate (dedicated) parameter or joint with another parameter. For instance, the UE may perform the interference measurement on the CSI-IM resource(s) in one or more CSI-IM resource subsets whose bits/positions in the bitmap are configured as "1"s; if the bitmap contains all "1"s, the UE may perform the interference measurement on all the CSI-IM resources configured in the CSI-IM resource set in the CSI resource setting configured for the multi-TRP operation.

For the configured CSI reporting setting with the higher layer parameter reportQuantity set to "cri-SINR" or "ssb-Index-SINR," in another example, the UE could receive from the network a MAC-CE command selecting/activating one or more CSI-IM resource subsets (and therefore, the CSI-IM resources therein) for interference measurement. If the MAC-CE command activates all the $T_s$ CSI-IM resource subsets, the UE may perform the interference measurement on all the CSI-IM resources configured in the CSI-IM resource set in the CSI resource setting configured for the multi-TRP operation.

For the configured CSI reporting setting with the higher layer parameter reportQuantity set to "cri-SINR" or "ssb-Index-SINR," in yet another example, the UE may perform the interference measurement on all the CSI-IM resources configured in the CSI-IM resource set in the CSI resource setting regardless how they are divided into the $T_s$ CSI-IM resource subsets and/or how they are associated with different TRPs in the multi-TRP system, if the UE is configured to do so and/or if the UE does not receive any additional configuration/indication such as the bitmap and the MAC-CE activation command to indicate the CSI-IM resource subset(s) (and therefore, the CSI-IM resource(s) therein) for interference measurement.

Other methods to indicate the CSI-IM resource subset(s) (and therefore, the CSI-IM resource(s) therein) for interference measurement, e.g., any combination of at least two of the above described design examples, are also possible.

The UE may assume that the NZP CSI-RS resource(s) for channel measurement and the CSI-IM resource(s) for interference measurement configured in the same CSI reporting setting (e.g., via the higher layer parameter CSI-ReportConfig) are QCL'ed with respect to "typeD." Each NZP CSI-RS resource for channel measurement is associated with one CSI-IM resource for interference measurement by the ordering of the NZP CSI-RS resource for channel measurement and CSI-IM resource for interference measurement in the corresponding resource sets. The number of CSI-RS resources for channel measurement equals to the number of CSI-IM resources for interference measurement.

In one embodiment of 2.A.2, multiple CSI reporting settings configured for multi-TRP operation are provided.

The UE could be higher layer configured by the network P>1 CSI reporting settings for the multi-TRP operation, which could be regarded/labelled as the first CSI reporting setting, the second CSI reporting setting, and so on, and the P-th CSI reporting setting. For example, the first CSI reporting setting could have the lowest CSI reporting setting ID value (e.g., the higher layer parameter CSI-ReportConfigId), the second CSI reporting setting could have the second lowest CSI reporting setting ID value, and so on, and the P-th CSI reporting setting could have the highest CSI reporting setting ID value (other association/mapping relationships between the ordering of the CSI reporting settings and the CSI reporting setting ID values are also possible); each CSI reporting setting could be associated with one or more TRPs in the multi-TRP system.

A single TRP in the multi-TRP system could be associated with a single CSI reporting setting. Additional details about the association between the P>1 CSI reporting settings and the coordinating TRPs in the multi-TRP system may be found in U.S. patent application Ser. No. 17/452,981 and U.S. patent application Ser. No. 17/654,749.

According to the 3GPP TS 38.214, in a configured CSI reporting setting (e.g., via the higher layer parameter CSI-ReportConfig), the UE could be configured a CSI resource setting (e.g., given by the higher layer parameter resourcesForChannelMeasurement) for channel measurement on NZP CSI-RS resource(s).

As discussed in part 1.A in this disclosure, in a given CSI resource setting (e.g., via the higher layer parameter CSI-ResourceConfig), a single CSI-RS resource set could be configured comprising of $M_s$>1 CSI-RS resource subsets for the coordinating TRPs in the multi-TRP system. As more than one CSI reporting settings (P>1) are configured here for the multi-TRP operation, a given CSI reporting setting could be associated with a subset (e.g., one) of all the $M_s$ CSI-RS resource subsets configured in the CSI-RS resource set in the CSI resource setting, and each CSI-RS resource subset configured in the CSI-RS resource set in the CSI resource setting is associated with a CSI reporting setting. There are various means to indicate the CSI-RS resource subset(s) (and therefore, the NZP CSI-RS resource(s) therein) associated with a CSI reporting setting for channel measurement such as the bitmap and the MAC-CE activation based strategies discussed in part 1.A in this disclosure.

Further, the UE could be configured another CSI resource setting (e.g., given by the higher layer parameter csi-IM-ResourcesForInterference) for interference measurement performed on the CSI-IM resource(s). As discussed above, in a given CSI resource setting (e.g., via the higher layer parameter CSI-ResourceConfig), a single CSI-IM resource set could be configured comprising of $T_s$>1 CSI-IM resource subsets for the coordinating TRPs in the multi-TRP system.

As more than one CSI reporting settings (P>1) are configured here for the multi-TRP operation, a given CSI reporting setting could be associated with a subset (e.g., one) of all the $T_s$ CSI-IM resource subsets configured in the CSI-IM resource set in the CSI resource setting, and each CSI-IM resource subset configured in the CSI-IM resource set in the CSI resource setting is associated with a CSI reporting setting.

Additional details about the association between the $T_s$ CSI-IM resource subsets and the P CSI reporting settings may be found in U.S. patent application Ser. No. 17/452,981 and U.S. patent application Ser. No. 17/654,749.

For the association between the $M_s$ CSI-RS resource subsets and the P CSI reporting settings. Assume that the configured CSI reporting setting #A with the higher layer parameter reportQuantity set to "cri-SINR" or "ssb-Index-SINR" is associated with $T_a$ CSI-IM resource subset(s) ($1 \le T_a \le T_s$), in one example, the UE could receive from the network a bitmap of length $T_a$, with each bit in the bitmap corresponding to a CSI-IM resource subset associated with the CSI reporting setting #A, to indicate the CSI-IM resource subset(s) (and therefore, the NZP CSI-RS resource (s) therein) for interference measurement. This indication could be via higher layer (RRC) or/and MAC CE or/and DCI based signaling or/and any combination of at least two of RRC, MAC CE and DCI based signaling; this indication could be via a separate (dedicated) parameter or joint with another parameter. For instance, the UE may perform the interference measurement on the CSI-IM resource(s) in one or more CSI-IM resource subsets associated with the CSI reporting setting #A whose bits/positions in the bitmap are configured as "1"s; if the bitmap contains all "1"s, the UE may perform the interference measurement on all the CSI-IM resources configured in the $T_a$ CSI-IM resource subsets in the CSI-IM resource set in the CSI resource setting configured for the multi-TRP operation.

For the association between the $M_s$ CSI-RS resource subsets and the P CSI reporting settings. Assume that the configured CSI reporting setting #A with the higher layer parameter reportQuantity set to "cri-SINR" or "ssb-Index-SINR" is associated with $T_a$ CSI-IM resource subset(s) ($1 \leq T_a \leq T_s$), in another example, the UE could receive from the network a MAC-CE command selecting/activating one or more CSI-IM resource subsets (and therefore, the CSI-IM resources therein) associated with the CSI reporting setting #A for interference measurement. If the MAC-CE command activates all the $T_a$ CSI-IM resource subsets, the UE may perform the interference measurement on all the CSI-IM resources configured in the $T_a$ CSI-IM resource subsets in the CSI-IM resource set in the CSI resource setting configured for the multi-TRP operation.

For the association between the $M_s$ CSI-RS resource subsets and the P CSI reporting settings. Assume that the configured CSI reporting setting #A with the higher layer parameter reportQuantity set to "cri-SINR" or "ssb-Index-SINR" is associated with $T_a$ CSI-IM resource subset(s) ($1 \leq T_a \leq T_s$), in yet another example, the UE may perform the interference measurement on all the CSI-IM resources configured in the $T_a$ CSI-IM resource subsets in the CSI-IM resource set in the CSI resource setting regardless how they are associated with different TRPs in the multi-TRP system, if the UE is configured to do so and/or if the UE does not receive any additional configuration/indication such as the bitmap and the MAC-CE activation command to indicate the CSI-IM resource subset(s) (and therefore, the CSI-IM resource(s) therein) associated with the CSI reporting setting #A for interference measurement.

Other methods to indicate the CSI-IM resource subset(s) (and therefore, the CSI-IM resource(s) therein) associated with a CSI reporting setting for interference measurement, e.g., any combination of at least two of the above described design examples, are also possible.

The UE may assume that the NZP CSI-RS resource(s) for channel measurement and the CSI-IM resource(s) for interference measurement configured in the same or across different CSI reporting setting(s) (e.g., via the higher layer parameter CSI-ReportConfig(s)) are QCL'ed with respect to "typeD." Each NZP CSI-RS resource for channel measurement is associated with one CSI-IM resource for interference measurement by the ordering of the NZP CSI-RS resource for channel measurement and CSI-IM resource for interference measurement in the corresponding resource sets. The number of CSI-RS resources for channel measurement equals to the number of CSI-IM resources for interference measurement.

In one embodiment of 2.B, multiple CSI-IM resource sets configured in a single CSI resource setting for multi-TRP operation are provided.

The UE could be higher layer configured by the network (e.g., via the higher layer parameter CSI-ResourceConfig) M=1 CSI resource setting for the multi-TRP operation. In the configured CSI resource setting, the UE could be higher layer configured by the network S'>1 CSI-IM resource sets (e.g., via the higher layer parameter CSI-IM-ResourceSet, denoted by the first CSI-IM resource set, the second CSI-IM resource set, . . . , and the S'-th CSI-IM resource set), each corresponding to/associated with a coordinating TRP in the multi-TRP system.

Additional details about the association between the S'>1 CSI-IM resource sets and the coordinating TRPs in the multi-TRP system may be found in U.S. patent application Ser. No. 17/452,981 and U.S. patent application Ser. No. 17/654,749, for the association between the S>1 CSI-RS resource sets and the coordinating TRPs in the multi-TRP system.

In one embodiment of 2.B.1, a single CSI reporting setting configured for multi-TRP operation is provided.

The UE could be higher layer configured by the network P=1 CSI reporting setting for the multi-TRP operation. The single CSI reporting setting is for all the coordinating TRPs in the multi-TRP system. The P=1 CSI reporting setting can include one CSI-report for all TRPs in the multi-TRP system or more than one (e.g., one CSI-report per TRP in the multi-TRP system) CSI-reports.

Additional details about the association between the CSI-report(s) in the single CSI reporting setting and the coordinating TRPs in the multi-TRP system may be found in U.S. patent application Ser. No. 17/452,981 and U.S. patent application Ser. No. 17/654,749.

According to the 3GPP TS 38.214, in the configured CSI reporting setting (e.g., via the higher layer parameter CSI-ReportConfig), the UE could be configured a CSI resource setting (e.g., given by the higher layer parameter resourcesForChannelMeasurement) for channel measurement on NZP CSI-RS resource(s). As discussed in part 1.B in this disclosure, in a given CSI resource setting (e.g., via the higher layer parameter CSI-ResourceConfig), more than one (S>1) CSI-RS resource sets could be configured for the coordinating TRPs in the multi-TRP system. There are various means to indicate the CSI-RS resource set(s) (and therefore, the NZP CSI-RS resource(s) therein) for channel measurement such as the bitmap and the MAC-CE activation based strategies discussed in part 1.B in this disclosure.

Further, the UE could be configured another CSI resource setting (e.g., given by the higher layer parameter csi-IM-ResourcesForInterference) for interference measurement performed on the CSI-IM resource(s). As discussed above, in a given CSI resource setting (e.g., via the higher layer parameter CSI-ResourceConfig), more than one (S'>1) CSI-IM resource sets could be configured for the coordinating TRPs in the multi-TRP system.

Hence, for the configured CSI reporting setting with the higher layer parameter reportQuantity set to "cri-SINR" or "ssb-Index-SINR," in one example, the UE could receive from the network a bitmap of length S," with each bit in the bitmap corresponding to a CSI-IM resource set, to indicate the CSI-IM resource set(s) (and therefore, the CSI-IM resource(s) therein) for interference measurement. This indication could be via higher layer (RRC) or/and MAC CE or/and DCI based signaling or/and any combination of at least two of RRC, MAC CE and DCI based signaling; this indication could be via a separate (dedicated) parameter or joint with another parameter. For instance, the UE may perform the interference measurement on the CSI-IM resource(s) in one or more CSI-IM resource sets configured for the multi-TRP operation whose bits/positions in the bitmap are configured as "1"s; if the bitmap contains all "1"s, the UE may perform the interference measurement on all the CSI-IM resources configured in the S' CSI-IM resource sets in the CSI resource setting configured for the multi-TRP operation.

For the configured CSI reporting setting with the higher layer parameter reportQuantity set to "cri-SINR" or "ssb-Index-SINR," in another example, the UE could receive from the network a MAC-CE command selecting/activating one or more CSI-IM resource sets (and therefore, the CSI-IM resources therein) for interference measurement. If the MAC-CE command activates all the S' CSI-IM resource sets configured in the CSI resource setting for the multi-TRP operation, the UE may perform the interference measurement on all the CSI-IM resources configured in the S' CSI-IM resource sets in the CSI resource setting configured for the multi-TRP operation.

For the configured CSI reporting setting with the higher layer parameter reportQuantity set to "cri-SINR" or "ssb-Index-SINR," in yet another example, the UE may perform the interference measurement on all the CSI-IM resources configured in the S'>1 CSI-IM resource sets in the CSI resource setting regardless how they are associated with different TRPs in the multi-TRP system, if the UE is configured to do so and/or if the UE does not receive any additional configuration/indication such as the bitmap and the MAC-CE activation command to indicate the CSI-IM resource set(s) (and therefore, the CSI-IM resource(s) therein) for interference measurement.

Other methods to indicate the CSI-IM resource set(s) (and therefore, the CSI-IM resource(s) therein) for interference measurement, e.g., any combination of at least two of the above described design examples, are also possible.

The UE may assume that the NZP CSI-RS resource(s) for channel measurement and the CSI-IM resource(s) for interference measurement configured in the same CSI reporting setting (e.g., via the higher layer parameter CSI-ReportConfig) are QCL'ed with respect to "typeD." Each NZP CSI-RS resource for channel measurement is associated with one CSI-IM resource for interference measurement by the ordering of the NZP CSI-RS resource for channel measurement and CSI-IM resource for interference measurement in the corresponding resource sets. The number of CSI-RS resources for channel measurement equals to the number of CSI-IM resources for interference measurement.

In one embodiment of 2.B.2, multiple CSI reporting settings configured for multi-TRP operation are provided.

The UE could be higher layer configured by the network P>1 CSI reporting settings for the multi-TRP operation, which could be regarded/labelled as the first CSI reporting setting, the second CSI reporting setting, and so on, and the P-th CSI reporting setting. For example, the first CSI reporting setting could have the lowest CSI reporting setting ID value (e.g., higher layer parameter CSI-ReportConfigId), the second CSI reporting setting could have the second lowest CSI reporting setting ID value, and so on, and the P-th CSI reporting setting could have the highest CSI reporting setting ID value (other association/mapping relationships between the ordering of the CSI reporting settings and the CSI reporting setting ID values are also possible); each CSI reporting setting could be associated with one or more TRPs in the multi-TRP system.

A single TRP in the multi-TRP system could be associated with a single CSI reporting setting. Additional details about the association between the P>1 CSI reporting settings and the coordinating TRPs in the multi-TRP system may be found in U.S. patent application Ser. No. 17/452,981 and U.S. patent application Ser. No. 17/654,749.

According to the 3GPP TS 38.214, in a configured CSI reporting setting (e.g., via the higher layer parameter CSI-ReportConfig), the UE could be configured a CSI resource setting (e.g., given by the higher layer parameter resourcesForChannelMeasurement) for channel measurement on NZP CSI-RS resource(s).

As discussed in part 1.B in this disclosure, in a given CSI resource setting (e.g., via the higher layer parameter CSI-ResourceConfig), more than one (S>1) CSI-RS resource sets could be configured for the coordinating TRPs in the multi-TRP system. As more than one CSI reporting settings (P>1) are configured here for the multi-TRP operation, a given CSI reporting setting could be associated with a subset (e.g., one) of all the S CSI-RS resource sets configured in the CSI resource setting for the multi-TRP operation, and each CSI-RS resource set configured in the CSI resource setting for the multi-TRP operation is associated with a CSI reporting setting. There are various means to indicate the CSI-RS resource set(s) (and therefore, the NZP CSI-RS resource(s) therein) associated with a CSI reporting setting for channel measurement such as the bitmap and the MAC-CE activation based strategies discussed in part 1.B in this disclosure.

Further, the UE could be configured another CSI resource setting (e.g., given by the higher layer parameter csi-IM-ResourcesForInterference) for interference measurement performed on the CSI-IM resource(s). As discussed above, in a given CSI resource setting (e.g., via the higher layer parameter CSI-ResourceConfig), more than one (S'>1) CSI-IM resource sets could be configured for the coordinating TRPs in the multi-TRP system. As more than one CSI reporting settings (P>1) are configured here for the multi-TRP operation, a given CSI reporting setting could be associated with a subset (e.g., one) of all the S' CSI-IM resource sets configured in the CSI resource setting for the multi-TRP operation, and each CSI-IM resource set configured in the CSI resource setting for the multi-TRP operation is associated with a CSI reporting setting.

Additional details about the association between the S'>1 CSI-IM resource sets and the P CSI reporting settings may be found in U.S. patent application Ser. No. 17/452,981 and U.S. patent application Ser. No. 17/654,749, for the association between the S>1 CSI-RS resource sets and the P CSI reporting settings.

Assume that the configured CSI reporting setting #B with the higher layer parameter reportQuantity set to "cri-SINR" or "ssb-Index-SINR" is associated with $S_b$ CSI-IM resource set(s) ($1 \leq S_b \leq S'$), in one example, the UE could receive from the network a bitmap of length $S_b$, with each bit in the bitmap corresponding to a CSI-IM resource set associated with the CSI reporting setting #B, to indicate the CSI-IM resource set(s) (and therefore, the CSI-IM resource(s) therein) for interference measurement. This indication could be via higher layer (RRC) or/and MAC CE or/and DCI based signaling or/and any combination of at least two of RRC, MAC CE and DCI based signaling; this indication could be via a separate (dedicated) parameter or joint with another parameter. For instance, the UE may perform the interference measurement on the CSI-IM resource(s) in one or more CSI-IM resource sets associated with the CSI reporting setting #B whose bits/positions in the bitmap are configured as "1"s; if the bitmap contains all "1"s, the UE may perform the interference measurement on all the CSI-IM resources configured in the $S_b$ CSI-IM resource sets in the CSI resource setting configured for the multi-TRP operation.

Assume that the configured CSI reporting setting #B with the higher layer parameter reportQuantity set to "cri-SINR" or "ssb-Index-SINR" is associated with $S_b$ CSI-IM resource set(s) (1≤$S_b$≤S'), in another example, the UE could receive from the network a MAC-CE command selecting/activating one or more CSI-IM resource sets (and therefore, the CSI-IM resources therein) associated with the CSI reporting setting #B for interference measurement. If the MAC-CE command activates all the $S_b$ CSI-IM resource sets, the UE may perform the interference measurement on all the CSI-IM resources configured in the $S_b$ CSI-IM resource sets in the CSI resource setting configured for the multi-TRP operation.

Assume that the configured CSI reporting setting #B with the higher layer parameter reportQuantity set to "cri-SINR" or "ssb-Index-SINR" is associated with $S_b$ CSI-IM resource set(s) (1≤$S_b$≤S'), in yet another example, the UE may perform the interference measurement on all the CSI-IM resources configured in the $S_b$ CSI-IM resource sets in the CSI resource setting regardless how they are associated with different TRPs in the multi-TRP system, if the UE is configured to do so and/or if the UE does not receive any additional configuration/indication such as the bitmap and the MAC-CE activation command to indicate the CSI-IM resource set(s) (and therefore, the CSI-IM resource(s) therein) associated with the CSI reporting setting #B for interference measurement.

Other methods to indicate the CSI-IM resource set(s) (and therefore, the CSI-IM resource(s) therein) associated with a CSI reporting setting for interference measurement, e.g., any combination of at least two of the above described design examples, are also possible.

The UE may assume that the NZP CSI-RS resource(s) for channel measurement and the CSI-IM resource(s) for interference measurement configured in the same or across different CSI reporting setting(s) (e.g., via the higher layer parameter CSI-ReportConfig(s)) are QCL'ed with respect to "typeD." Each NZP CSI-RS resource for channel measurement is associated with one CSI-IM resource for interference measurement by the ordering of the NZP CSI-RS resource for channel measurement and CSI-IM resource for interference measurement in the corresponding resource sets. The number of CSI-RS resources for channel measurement equals to the number of CSI-IM resources for interference measurement.

In one embodiment of 2.C, multiple CSI resource settings configured for multi-TRP operation are provided.

The UE could be higher layer configured by the network (e.g., via the higher layer parameter CSI-ResourceConfig) M'>1 CSI resource settings for the multi-TRP operation with at least one (S'=1) CSI-IM resource set per CSI resource setting, and each CSI resource setting is associated with/corresponds to a coordinating TRP in the multi-TRP system; the M'>1 CSI resource settings configured for the multi-TRP operation could be denoted by the first CSI resource setting, the second CSI resource setting, . . . , and the M'-th CSI resource setting.

Additional details about the association between the M'>1 CSI resource settings and the coordinating TRPs in the multi-TRP system may be found in U.S. patent application Ser. No. 17/452,981 and U.S. patent application Ser. No. 17/654,749.

In one embodiment of 2.C.1, a single CSI reporting setting configured for multi-TRP operation is provided.

The UE could be higher layer configured by the network P=1 CSI reporting setting for the multi-TRP operation. The single CSI reporting setting is for all the coordinating TRPs in the multi-TRP system. The P=1 CSI reporting setting can include one CSI-report for all TRPs in the multi-TRP system or more than one (e.g., one CSI-report per TRP in the multi-TRP system) CSI-reports.

Additional details about the association between the CSI-report(s) in the single CSI reporting setting and the coordinating TRPs in the multi-TRP system may be found in U.S. patent application Ser. No. 17/452,981 and U.S. patent application Ser. No. 17/654,749.

In the configured CSI reporting setting (e.g., via the higher layer parameter CSI-ReportConfig), the UE could be configured a list of (at least one) CSI resource settings (e.g., given by the higher layer parameter resourcesForChannelMeasurement) for channel measurement on NZP CSI-RS resource(s). As discussed in part 1.0 in this disclosure, more than one (M>1) CSI resource settings could be configured for the coordinating TRPs in the multi-TRP system. There are various means to indicate the CSI resource setting(s) (and therefore, the NZP CSI-RS resource(s) therein) for channel measurement such as the bitmap and the MAC-CE activation based strategies discussed in part 1.0 in this disclosure.

Further, the UE could be configured another list of (at least one) CSI resource settings (e.g., given by the higher layer parameter csi-IM-ResourcesForInterference) for interference measurement performed on the CSI-IM resource(s). As discussed above, more than one (M'>1) CSI resource settings containing at least one CSI-IM resource set could be configured for the coordinating TRPs in the multi-TRP system.

Hence, for the configured CSI reporting setting with the higher layer parameter reportQuantity set to "cri-SINR" or "ssb-Index-SINR," in one example, the UE could receive from the network a bitmap of length M," with each bit in the bitmap corresponding to a CSI resource setting configured for the multi-TRP operation, to indicate the CSI resource setting(s) (and therefore, the CSI-IM resource(s) therein) for interference measurement. This indication could be via higher layer (RRC) or/and MAC CE or/and DCI based signaling or/and any combination of at least two of RRC, MAC CE and DCI based signaling; this indication could be via a separate (dedicated) parameter or joint with another parameter. For instance, the UE may perform the interference measurement on the CSI-IM resource(s) in one or more CSI resource settings configured for the multi-TRP operation whose bits/positions in the bitmap are configured as "1"s; if the bitmap contains all "1"s, the UE may perform the interference measurement on all the CSI-IM resources configured in the M' CSI resource settings for the multi-TRP operation.

For the configured CSI reporting setting with the higher layer parameter reportQuantity set to "cri-SINR" or "ssb-Index-SINR," in another example, the UE could receive from the network a MAC-CE command selecting/activating one or more CSI resource settings (and therefore, the CSI-IM resources therein) for interference measurement. If the MAC-CE command activates all the M' CSI resource settings configured for the multi-TRP operation, the UE may perform the interference measurement on all the CSI-IM resources configured in the M' CSI resource settings configured for the multi-TRP operation.

For the configured CSI reporting setting with the higher layer parameter reportQuantity set to "cri-SINR" or "ssb-Index-SINR," in yet another example, the UE may perform the interference measurement on all the CSI-IM resources configured in the M'>1 CSI resource settings regardless how they are associated with different TRPs in the multi-TRP system, if the UE is configured to do so and/or if the UE does not receive any additional configuration/indication such as the bitmap and the MAC-CE activation command to indicate the CSI resource setting(s) (and therefore, the CSI-IM resource(s) therein) for interference measurement.

Other methods to indicate the CSI resource setting(s) (and therefore, the CSI-IM resource(s) therein) for interference measurement, e.g., any combination of at least two of the above described design examples, are also possible.

The UE may assume that the NZP CSI-RS resource(s) for channel measurement and the CSI-IM resource(s) for interference measurement configured in the same CSI reporting setting (e.g., via the higher layer parameter CSI-ReportConfig) are QCL'ed with respect to "typeD." Each NZP CSI-RS resource for channel measurement is associated with one CSI-IM resource for interference measurement by the ordering of the NZP CSI-RS resource for channel measurement and CSI-IM resource for interference measurement in the corresponding resource sets. The number of CSI-RS resources for channel measurement equals to the number of CSI-IM resources for interference measurement.

In one embodiment of 2.C.2, multiple CSI reporting settings for multi-TRP operation are provided.

The UE could be higher layer configured by the network P>1 CSI reporting settings for the multi-TRP operation, which could be regarded/labelled as the first CSI reporting setting, the second CSI reporting setting, and so on, and the P-th CSI reporting setting. For example, the first CSI reporting setting could have the lowest CSI reporting setting ID value (e.g., higher layer parameter CSI-ReportConfigId), the second CSI reporting setting could have the second lowest CSI reporting setting ID value, and so on, and the P-th CSI reporting setting could have the highest CSI reporting setting ID value (other association/mapping relationships between the ordering of the CSI reporting settings and the CSI reporting setting ID values are also possible); each CSI reporting setting could be associated with one or more TRPs in the multi-TRP system. A single TRP in the multi-TRP system could be associated with a single CSI reporting setting.

Additional details about the association between the P>1 CSI reporting settings and the coordinating TRPs in the multi-TRP system may be found in U.S. patent application Ser. No. 17/452,981 and U.S. patent application Ser. No. 17/654,749.

In a configured CSI reporting setting (e.g., via the higher layer parameter CSI-ReportConfig), the UE could be configured a list of (at least one) CSI resource settings (e.g., given by the higher layer parameter resourcesForChannelMeasurement) for channel measurement on NZP CSI-RS resource(s). As discussed in part 1.0 in this disclosure, more than one (M>1) CSI resource settings could be configured for the coordinating TRPs in the multi-TRP system. As more than one CSI reporting settings (P>1) are configured here for the multi-TRP operation, a given CSI reporting setting could be associated with a subset (e.g., one) of all the M CSI resource settings configured for the multi-TRP operation, and each CSI resource setting configured for the multi-TRP operation is associated with a CSI reporting setting. There are various means to indicate the CSI resource setting(s) (and therefore, the NZP CSI-RS resource(s) therein) associated with a CSI reporting setting for channel measurement such as the bitmap and the MAC-CE activation based strategies discussed in part 1.0 in this disclosure.

Further, the UE could be configured another list of (at least one) CSI resource settings (e.g., given by the higher layer parameter csi-IM-ResourcesForInterference) for interference measurement performed on the CSI-IM resource(s). As discussed above, more than one (M'>1) CSI resource settings containing at least one CSI-IM resource set could be configured for the coordinating TRPs in the multi-TRP system. As more than one CSI reporting settings (P>1) are configured here for the multi-TRP operation, a given CSI reporting setting could be associated with a subset (e.g., one) of all the M' CSI resource settings configured for the multi-TRP operation, and each CSI resource setting configured for the multi-TRP operation is associated with a CSI reporting setting.

Additional details about the association between the M'>1 CSI resource settings configured for the multi-TRP operation and the P CSI reporting settings may be found in U.S. patent application Ser. No. 17/452,981 and U.S. patent application Ser. No. 17/654,749, for the association between the M>1 CSI resource settings configured for the multi-TRP operation and the P CSI reporting settings.

Assume that the configured CSI reporting setting #C with the higher layer parameter reportQuantity set to "cri-SINR" or "ssb-Index-SINR" is associated with $M_c$ CSI resource setting(s) ($1 \leq M_c \leq M'$), in one example, the UE could receive from the network a bitmap of length $M_c$, with each bit in the bitmap corresponding to a CSI resource setting associated with the CSI reporting setting #C, to indicate the CSI resource setting(s) (and therefore, the CSI-IM resource(s) therein) for interference measurement. This indication could be via higher layer (RRC) or/and MAC CE or/and DCI based signaling or/and any combination of at least two of RRC, MAC CE and DCI based signaling; this indication could be via a separate (dedicated) parameter or joint with another parameter. For instance, the UE may perform the interference measurement on the CSI-IM resource(s) in one or more CSI resource settings associated with the CSI reporting setting #C whose bits/positions in the bitmap are configured as "1"s; if the bitmap contains all "1"s, the UE may perform the interference measurement on all the CSI-IM resources configured in the $M_c$ CSI resource settings configured for the multi-TRP operation.

Assume that the configured CSI reporting setting #C with the higher layer parameter reportQuantity set to "cri-SINR" or "ssb-Index-SINR" is associated with $M_c$ CSI resource setting(s) ($1 \leq M_c \leq M'$), in another example, the UE could receive from the network a MAC-CE command selecting/activating one or more CSI resource settings (and therefore, the CSI-IM resources therein) associated with the CSI reporting setting #C for interference measurement. If the MAC-CE command activates all the $M_c$ CSI resource settings, the UE may perform the interference measurement on all the CSI-IM resources configured in the $M_c$ CSI resource settings configured for the multi-TRP operation.

Assume that the configured CSI reporting setting #C with the higher layer parameter reportQuantity set to "cri-SINR" or "ssb-Index-SINR" is associated with $M_c$ CSI resource setting(s) ($1 \leq M_c \leq M'$), in yet another example, the UE may perform the interference measurement on all the CSI-IM resources configured in the $M_c$ CSI resource settings regardless how they are associated with different TRPs in the multi-TRP system, if the UE is configured to do so and/or if the UE does not receive any additional configuration/indication such as the bitmap and the MAC-CE activation command to indicate the CSI resource setting(s) (and therefore, the CSI-IM resource(s) therein) associated with the CSI reporting setting #C for interference measurement.

Other methods to indicate the CSI resource setting(s) (and therefore, the CSI-IM resource(s) therein) associated with a CSI reporting setting for interference measurement, e.g., any combination of at least two of the above described design examples, are also possible.

The UE may assume that the NZP CSI-RS resource(s) for channel measurement and the CSI-IM resource(s) for interference measurement configured in the same or across different CSI reporting setting(s) (e.g., via the higher layer parameter CSI-ReportConfig(s)) are QCL'ed with respect to "typeD." Each NZP CSI-RS resource for channel measurement is associated with one CSI-IM resource for interference measurement by the ordering of the NZP CSI-RS resource for channel measurement and CSI-IM resource for interference measurement in the corresponding resource sets. The number of CSI-RS resources for channel measurement equals to the number of CSI-IM resources for interference measurement.

A UE could be equipped with RX panels, which could correspond to Np sets of RX antenna elements/ports and/or Np sets of measurement RSs such as SRSs and/or Np spatial domain RX filters and/or etc. If the UE is higher layer configured by the network one or more CSI reporting setting with the higher layer parameter reportQuantity set to "cri-SINR" or "ssb-Index-SINR," for each RX panel, the UE could perform the channel measurement on one or more NZP CSI-RS resources configured in one or more CSI-RS resource subsets/CSI-RS resource sets/CSI resource settings configured for channel measurement (e.g., given by the higher layer parameter resourcesForChannelMeasurement), and perform the interference measurement on one or more NZP CSI-RS resources configured in one or more CSI-RS resource subsets/CSI-RS resource sets/CSI resource settings configured for channel measurement (e.g., given by the higher layer parameter resourcesForChannelMeasurement).

Here, the UE may not be configured by the network any NZP CSI-RS resource(s) or CSI-IM resource(s) for interference measurement, though the higher layer parameter reportQuantity in the configured CSI reporting setting(s) is set to "cri-SINR" or "ssb-Index-SINR."

In one embodiment of 3.A, multiple CSI-RS resource subsets configured in a single CSI-RS resource set (in a single CSI resource setting) for multi-TRP operation are provided.

Figure 9:
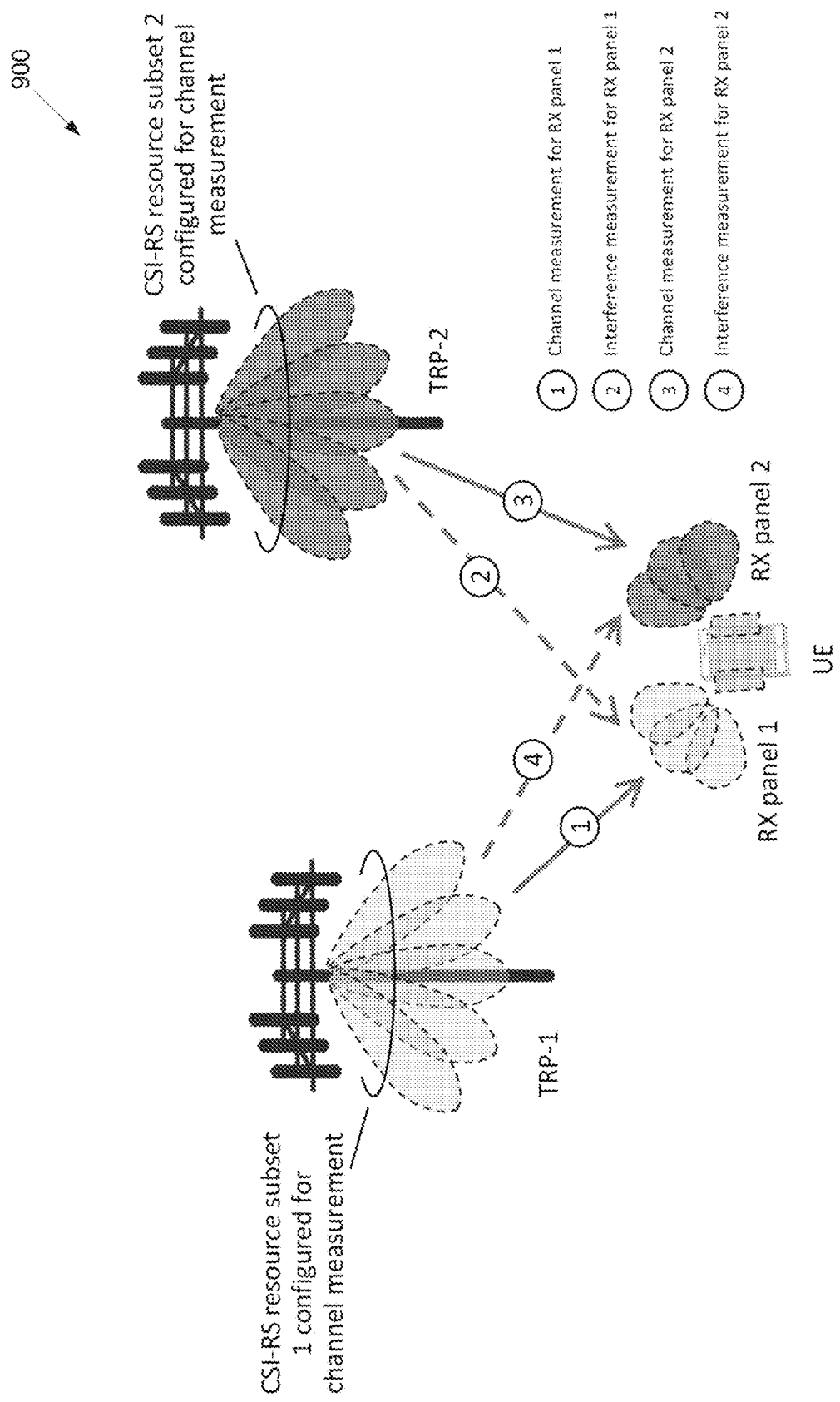
FIG. 9 illustrates an example of configuring channel measurement resource(s) and interference measurement resource(s) in a multi-TRP system according to embodiments of the present disclosure.

FIG. 9 illustrates an example of configuring channel measurement resource(s) and interference measurement resource(s) 900 in a multi-TRP system according to embodiments of the present disclosure. An embodiment of configuring the channel measurement resource(s) and the interference measurement resource(s) 900 in the multi-TRP system shown in FIG. 9 is for illustration only.

According to the 3GPP TS 38.214, in the configured CSI reporting setting(s) (e.g., via the higher layer parameter CSI-ReportConfig(s)), the UE could be configured a CSI resource setting (e.g., given by the higher layer parameter resourcesForChannelMeasurement) for channel measurement on NZP CSI-RS resource(s). As discussed in part 1.A in this disclosure, in a given CSI resource setting (e.g., via the higher layer parameter CSI-ResourceConfig), a single CSI-RS resource set could be configured comprising of $M_s > 1$ CSI-RS resource subsets for the coordinating TRPs in the multi-TRP system.

The UE could be indicated/configured by the network one or more CSI-RS resource subsets (out of the total $M_s$ CSI-RS resource subsets configured for channel measurement) for a given RX panel (e.g., with RX panel ID/index #p) for channel measurement, and one or more CSI-RS resource subsets (out of the total $M_s$ CSI-RS resource subsets configured for channel measurement) for the same RX panel (e.g., with RX panel ID/index #p) for interference measurement.

In FIG. 9, an illustrative example depicting the use of CSI-RS resource subsets (higher layer configured for channel measurement) for both channel and interference measurement for different RX panels at the UE is presented, wherein a multi-TRP system comprising of two TRPs (TRP-1 and TRP-2) and a UE equipped with two RX panels (RX panel 1 and RX panel 2) are considered.

Hence, for the configured CSI reporting setting(s) with the higher layer parameter reportQuantity set to "cri-SINR" or "ssb-Index-SINR," in one example, the UE could receive from the network a bitmap of length $M_s$ for/associated with a RX panel with each bit in the bitmap corresponding to a CSI-RS resource subset from the $M_s$ CSI-RS resource subsets configured for channel measurement. This bitmap could be used to indicate the CSI-RS resource subset(s) (and therefore, the NZP CSI-RS resource(s) therein) for both channel measurement and interference measurement for the corresponding RX panel. This indication could be via higher layer (RRC) or/and MAC CE or/and DCI based signaling or/and any combination of at least two of RRC, MAC CE and DCI based signaling; this indication could be via a separate (dedicated) parameter or joint with another parameter; this indication could also include the corresponding RX panel information such as the RX panel ID/index. For instance, the UE may perform the channel measurement for the corresponding RX panel on the NZP CSI-RS resource(s) configured in one or more CSI-RS resource subsets whose bits/positions in the bitmap are configured as "1"s; the UE may also perform the interference measurement for the corresponding RX panel on the NZP CSI-RS resource(s) configured in one or more CSI-RS resource subsets whose bits/positions in the bitmap are configured as "0"s. If the bitmap contains all "1"s, the UE may perform the channel measurement for the corresponding RX panel on all the NZP CSI-RS resources configured in the $M_s$ CSI-RS resource subsets configured for channel measurement. If the bitmap contains all "0"s, the UE may perform the interference measurement for the corresponding RX panel on all the NZP CSI-RS resources configured in the $M_s$ CSI-RS resource subsets configured for channel measurement.

For the configured CSI reporting setting(s) with the higher layer parameter reportQuantity set to "cri-SINR" or "ssb-Index-SINR," in another example, the UE could receive from the network a first bitmap of length $M_s$ for/associated with a RX panel with each bit in the bitmap corresponding to a CSI-RS resource subset from the $M_s$ CSI-RS resource subsets configured for channel measurement, and a second bitmap of length $M_s$ for/associated with a RX panel with each bit in the bitmap corresponding to a CSI-RS resource subset from the $M_s$ CSI-RS resource subsets configured for channel measurement. The first bitmap could be used to indicate the CSI-RS resource subset(s) (and therefore, the NZP CSI-RS resource(s) therein) for channel measurement for the corresponding RX panel. This indication of the first bitmap could be via higher layer (RRC) or/and MAC CE or/and DCI based signaling or/and any combination of at least two of RRC, MAC CE and DCI based signaling; this indication of the first bitmap could be via a separate (dedicated) parameter or joint with another parameter; this indication of the first bitmap could also include the corresponding RX panel information such as the RX panel ID/index. For instance, the UE may perform the channel measurement for the corresponding RX panel on the NZP CSI-RS resource(s) configured in one or more CSI-RS resource subsets whose bits/positions in the first bitmap are configured as "1"s; if the first bitmap contains all "1"s, the UE may perform the channel measurement for the corresponding RX panel on all the NZP CSI-RS resources configured in the $M_s$ CSI-RS resource subsets configured for channel measurement. The second bitmap could be used to indicate the CSI-RS resource subset(s) (and therefore, the NZP CSI-RS resource(s) therein) for interference measurement for the corresponding RX panel. This indication of the second bitmap could be via higher layer (RRC) or/and MAC CE or/and DCI based signaling or/and any combination of at least two of RRC, MAC CE and DCI based signaling; this indication of the second bitmap could be via a separate (dedicated) parameter or joint with another parameter; this indication of the second bitmap could also include the corresponding RX panel information such as the RX panel ID/index. For instance, the UE may perform the interference measurement for the corresponding RX panel on the NZP CSI-RS resource(s) configured in one or more CSI-RS resource subsets whose bits/positions in the second bitmap are configured as "1"s; if the second bitmap contains all "1"s, the UE may perform the interference measurement for the corresponding RX panel on all the NZP CSI-RS resources configured in the $M_s$ CSI-RS resource subsets configured for channel measurement.

For the configured CSI reporting setting(s) with the higher layer parameter reportQuantity set to "cri-SINR" or "ssb-Index-SINR," in yet another example, the UE could receive from the network a MAC-CE command selecting/activating one or more CSI-RS resource subset(s) from the $M_s$ CSI-RS resource subsets configured for channel measurement (and therefore, the NZP CSI-RS resource(s) therein) for the corresponding RX panel for channel measurement; the MAC-CE command could also include the RX panel information such as the RX panel ID/index. The CSI-RS resource subset(s) not activated/selected via the MAC-CE command from the $M_s$ CSI-RS resource subsets configured for channel measurement (and therefore, the NZP CSI-RS resource(s) therein) could be used by the UE for interference measurement for the corresponding RX panel. If the MAC-CE command activates all the $M_s$ CSI-RS resource subsets configured for channel measurement, the UE may perform the channel measurement on all the NZP CSI-RS resources configured in the $M_s$ CSI-RS resource subsets configured for channel measurement for the corresponding RX panel.

For the configured CSI reporting setting(s) with the higher layer parameter reportQuantity set to "cri-SINR" or "ssb-Index-SINR," in yet another example, the UE could receive from the network a first MAC-CE command selecting/activating one or more CSI-RS resource subset(s) from the $M_s$ CSI-RS resource subsets configured for channel measurement (and therefore, the NZP CSI-RS resource(s) therein) for the corresponding RX panel for channel measurement; the first MAC-CE command could also include the RX panel information such as the RX panel ID/index. If the first MAC-CE command activates all the $M_s$ CSI-RS resource subsets configured for channel measurement, the UE may perform the channel measurement on all the NZP CSI-RS resources configured in the $M_s$ CSI-RS resource subsets configured for channel measurement for the corresponding RX panel. The UE could receive from the network a second MAC-CE command selecting/activating one or more CSI-RS resource subset(s) from the $M_s$ CSI-RS resource subsets configured for channel measurement (and therefore, the NZP CSI-RS resource(s) therein) for the corresponding RX panel for interference measurement; the second MAC-CE command could also include the RX panel information such as the RX panel ID/index. If the second MAC-CE command activates all the $M_s$ CSI-RS resource subsets configured for channel measurement, the UE may perform the interference measurement on all the NZP CSI-RS resources configured in the $M_s$ CSI-RS resource subsets configured for channel measurement for the corresponding RX panel.

For the configured CSI reporting setting(s) with the higher layer parameter reportQuantity set to "cri-SINR" or "ssb-Index-SINR," in yet another example, the UE could autonomously determine which CSI-RS resource subset(s) from the $M_s$ CSI-RS resource subsets configured for channel measurement (and therefore, the NZP CSI-RS resource(s) therein) may be used for channel measurement and which CSI-RS resource subset(s) from the $M_s$ CSI-RS resource subsets configured for channel measurement (and therefore, the NZP CSI-RS resource(s) therein) may be used for interference measurement for a given RX panel, if the UE is configured to do so and/or if the UE does not receive any additional configuration/indication such as the bitmap(s) and the MAC-CE activation command(s) to indicate the CSI-RS resource subset(s) (and therefore, the NZP CSI-RS resource(s) therein) for channel measurement and/or interference measurement for the corresponding RX panel.

Other methods to indicate the CSI-RS resource subset(s) (and therefore, the NZP CSI-RS resource(s) therein) for channel/interference measurement, e.g., any combination of at least two of the above described design examples, are also possible.

The UE may assume that the NZP CSI-RS resource(s) used for channel measurement and the NZP CSI-RS resource(s) used for interference measurement configured in the same or across different CSI reporting setting(s) (e.g., via the higher layer parameter CSI-ReportConfig(s)) are QCL'ed with respect to "typeD." Each NZP CSI-RS resource used for channel measurement is associated with one NZP CSI-RS resource used for interference measurement by the ordering of the NZP CSI-RS resource used for channel measurement and the NZP CSI-RS resource used for interference measurement in the corresponding resource set(s). The number of NZP CSI-RS resources used for channel measurement equals to the number of NZP CSI-RS resources used for interference measurement.

In one embodiment of 3.B, multiple CSI-RS resource sets configured in a single CSI resource setting for multi-TRP operation are provided.

Figure 10:
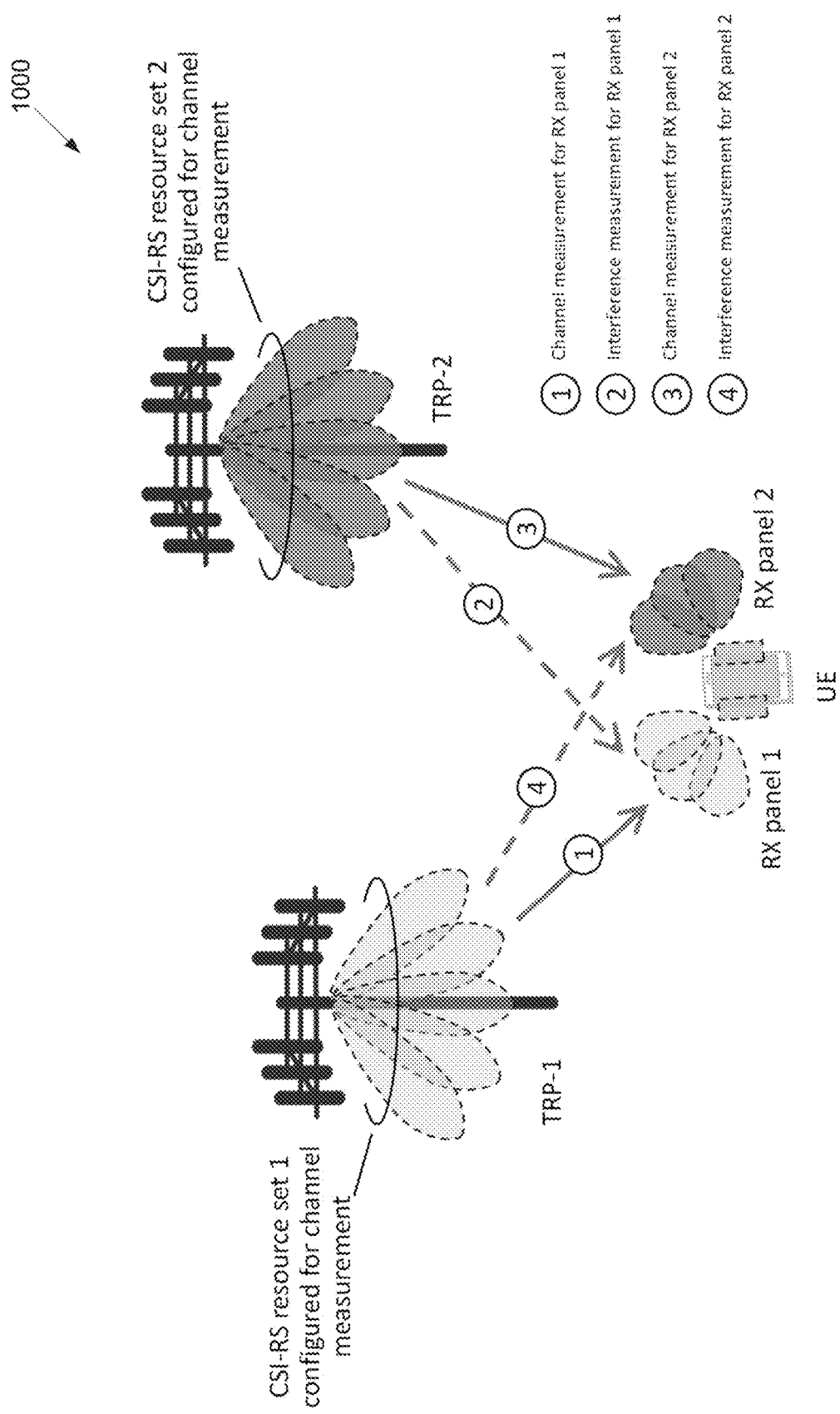
FIG. 10 illustrates another example of configuring channel measurement resource(s) and interference measurement resource(s) in a multi-TRP system according to embodiments of the present disclosure.

FIG. 10 illustrates another example of configuring channel measurement resource(s) and interference measurement resource(s) 1000 in a multi-TRP system according to embodiments of the present disclosure. An embodiment of configuring the channel measurement resource(s) and the interference measurement resource(s) 1000 in the multi-TRP system shown in FIG. 10 is for illustration only.

According to the 3GPP TS 38.214, in the configured CSI reporting setting(s) (e.g., via the higher layer parameter CSI-ReportConfig(s)), the UE could be configured a CSI resource setting (e.g., given by the higher layer parameter resourcesForChannelMeasurement) for channel measurement on NZP CSI-RS resource(s). As discussed in part 1.B in this disclosure, in a given CSI resource setting (e.g., via the higher layer parameter CSI-ResourceConfig), more than one (S>1) CSI-RS resource sets could be configured for the coordinating TRPs in the multi-TRP system. The UE could be indicated/configured by the network one or more CSI-RS resource sets (out of the total S CSI-RS resource sets configured for channel measurement) for a given RX panel (e.g., with RX panel ID/index #p) for channel measurement, and one or more CSI-RS resource sets (out of the total S CSI-RS resource sets configured for channel measurement) for the same RX panel (e.g., with RX panel ID/index #p) for interference measurement.

In FIG. 10, an illustrative example depicting the use of CSI-RS resource sets (higher layer configured for channel measurement) for both channel and interference measurement for different RX panels at the UE is presented, wherein a multi-TRP system comprising of two TRPs (TRP-1 and TRP-2) and a UE equipped with two RX panels (RX panel 1 and RX panel 2) are considered.

Hence, for the configured CSI reporting setting(s) with the higher layer parameter reportQuantity set to "cri-SINR" or "ssb-Index-SINR," in one example, the UE could receive from the network a bitmap of length S for/associated with a RX panel with each bit in the bitmap corresponding to a CSI-RS resource set from the S CSI-RS resource sets configured for channel measurement. This bitmap could be used to indicate the CSI-RS resource set(s) (and therefore, the NZP CSI-RS resource(s) therein) for both channel measurement and interference measurement for the corresponding RX panel. This indication could be via higher layer (RRC) or/and MAC CE or/and DCI based signaling or/and any combination of at least two of RRC, MAC CE and DCI based signaling; this indication could be via a separate (dedicated) parameter or joint with another parameter; this indication could also include the corresponding RX panel information such as the RX panel ID/index. For instance, the UE may perform the channel measurement for the corresponding RX panel on the NZP CSI-RS resource(s) configured in one or more CSI-RS resource sets whose bits/positions in the bitmap are configured as "1"s; the UE may also perform the interference measurement for the corresponding RX panel on the NZP CSI-RS resource(s) configured in one or more CSI-RS resource sets whose bits/positions in the bitmap are configured as "0"s. If the bitmap contains all "1"s, the UE may perform the channel measurement for the corresponding RX panel on all the NZP CSI-RS resources configured in the S CSI-RS resource sets configured for channel measurement. If the bitmap contains all "0"s, the UE may perform the interference measurement for the corresponding RX panel on all the NZP CSI-RS resources configured in the S CSI-RS resource sets configured for channel measurement.

For the configured CSI reporting setting(s) with the higher layer parameter reportQuantity set to "cri-SINR" or "ssb-Index-SINR," in another example, the UE could receive from the network a third bitmap of length S for/associated with a RX panel with each bit in the bitmap corresponding to a CSI-RS resource set from the S CSI-RS resource sets configured for channel measurement, and a fourth bitmap of length S for/associated with a RX panel with each bit in the bitmap corresponding to a CSI-RS resource set from the S CSI-RS resource sets configured for channel measurement. The third bitmap could be used to indicate the CSI-RS resource set(s) (and therefore, the NZP CSI-RS resource(s) therein) for channel measurement for the corresponding RX panel. This indication of the third bitmap could be via higher layer (RRC) or/and MAC CE or/and DCI based signaling or/and any combination of at least two of RRC, MAC CE and DCI based signaling; this indication of the third bitmap could be via a separate (dedicated) parameter or joint with another parameter; this indication of the third bitmap could also include the corresponding RX panel information such as the RX panel ID/index. For instance, the UE may perform the channel measurement for the corresponding RX panel on the NZP CSI-RS resource(s) configured in one or more CSI-RS resource sets whose bits/positions in the third bitmap are configured as "1"s; if the third bitmap contains all "1"s, the UE may perform the channel measurement for the corresponding RX panel on all the NZP CSI-RS resources configured in the S CSI-RS resource sets configured for channel measurement. The fourth bitmap could be used to indicate the CSI-RS resource set(s) (and therefore, the NZP CSI-RS resource(s) therein) for interference measurement for the corresponding RX panel. This indication of the fourth bitmap could be via higher layer (RRC) or/and MAC CE or/and DCI based signaling or/and any combination of at least two of RRC, MAC CE and DCI based signaling; this indication of the fourth bitmap could be via a separate (dedicated) parameter or joint with another parameter; this indication of the fourth bitmap could also include the corresponding RX panel information such as the RX panel ID/index. For instance, the UE may perform the interference measurement for the corresponding RX panel on the NZP CSI-RS resource(s) configured in one or more CSI-RS resource sets whose bits/positions in the fourth bitmap are configured as "1"s; if the fourth bitmap contains all "1"s, the UE may perform the interference measurement for the corresponding RX panel on all the NZP CSI-RS resources configured in the S CSI-RS resource sets configured for channel measurement.

For the configured CSI reporting setting(s) with the higher layer parameter reportQuantity set to "cri-SINR" or "ssb-Index-SINR," in yet another example, the UE could receive from the network a MAC-CE command selecting/activating one or more CSI-RS resource set(s) from the S CSI-RS resource sets configured for channel measurement (and therefore, the NZP CSI-RS resource(s) therein) for the corresponding RX panel for channel measurement; the MAC-CE command could also include the RX panel information such as the RX panel ID/index. The CSI-RS resource set(s) not activated/selected via the MAC-CE command from the S CSI-RS resource sets configured for channel measurement (and therefore, the NZP CSI-RS resource(s) therein) could be used by the UE for interference measurement for the corresponding RX panel. If the MAC-CE command activates all the S CSI-RS resource sets configured for channel measurement, the UE may perform the channel measurement on all the NZP CSI-RS resources configured in the S CSI-RS resource sets configured for channel measurement for the corresponding RX panel.

For the configured CSI reporting setting(s) with the higher layer parameter reportQuantity set to "cri-SINR" or "ssb-Index-SINR," in yet another example, the UE could receive from the network a third MAC-CE command selecting/activating one or more CSI-RS resource set(s) from the S CSI-RS resource sets configured for channel measurement (and therefore, the NZP CSI-RS resource(s) therein) for the corresponding RX panel for channel measurement; the third MAC-CE command could also include the RX panel information such as the RX panel ID/index. If the third MAC-CE command activates all the S CSI-RS resource sets configured for channel measurement, the UE may perform the channel measurement on all the NZP CSI-RS resources configured in the S CSI-RS resource sets configured for channel measurement for the corresponding RX panel. The UE could receive from the network a fourth MAC-CE command selecting/activating one or more CSI-RS resource set(s) from the S CSI-RS resource sets configured for channel measurement (and therefore, the NZP CSI-RS resource(s) therein) for the corresponding RX panel for interference measurement; the fourth MAC-CE command could also include the RX panel information such as the RX panel ID/index. If the fourth MAC-CE command activates all the S CSI-RS resource sets configured for channel measurement, the UE may perform the interference measurement on all the NZP CSI-RS resources configured in the S CSI-RS resource sets configured for channel measurement for the corresponding RX panel.

For the configured CSI reporting setting(s) with the higher layer parameter reportQuantity set to "cri-SINR" or "ssb-Index-SINR," in yet another example, the UE could autonomously determine which CSI-RS resource set(s) from the S CSI-RS resource sets configured for channel measurement (and therefore, the NZP CSI-RS resource(s) therein) may be used for channel measurement and which CSI-RS resource set(s) from the S CSI-RS resource sets configured for channel measurement (and therefore, the NZP CSI-RS resource(s) therein) may be used for interference measurement for a given RX panel, if the UE is configured to do so and/or if the UE does not receive any additional configuration/indication such as the bitmap(s) and the MAC-CE activation command(s) to indicate the CSI-RS resource set(s) (and therefore, the NZP CSI-RS resource(s) therein) for channel measurement and/or interference measurement for the corresponding RX panel.

Other methods to indicate the CSI-RS resource set(s) (and therefore, the NZP CSI-RS resource(s) therein) for channel/interference measurement, e.g., any combination of at least two of the above described design examples, are also possible.

The UE may assume that the NZP CSI-RS resource(s) used for channel measurement and the NZP CSI-RS resource(s) used for interference measurement configured in the same or across different CSI reporting setting(s) (e.g., via the higher layer parameter CSI-ReportConfig(s)) are QCL'ed with respect to "typeD." Each NZP CSI-RS resource used for channel measurement is associated with one NZP CSI-RS resource used for interference measurement by the ordering of the NZP CSI-RS resource used for channel measurement and the NZP CSI-RS resource used for interference measurement in the corresponding resource set(s). The number of NZP CSI-RS resources used for channel measurement equals to the number of NZP CSI-RS resources used for interference measurement.

In one embodiment of 3.C, multiple CSI resource settings for multi-TRP operation are provided.

Figure 11:
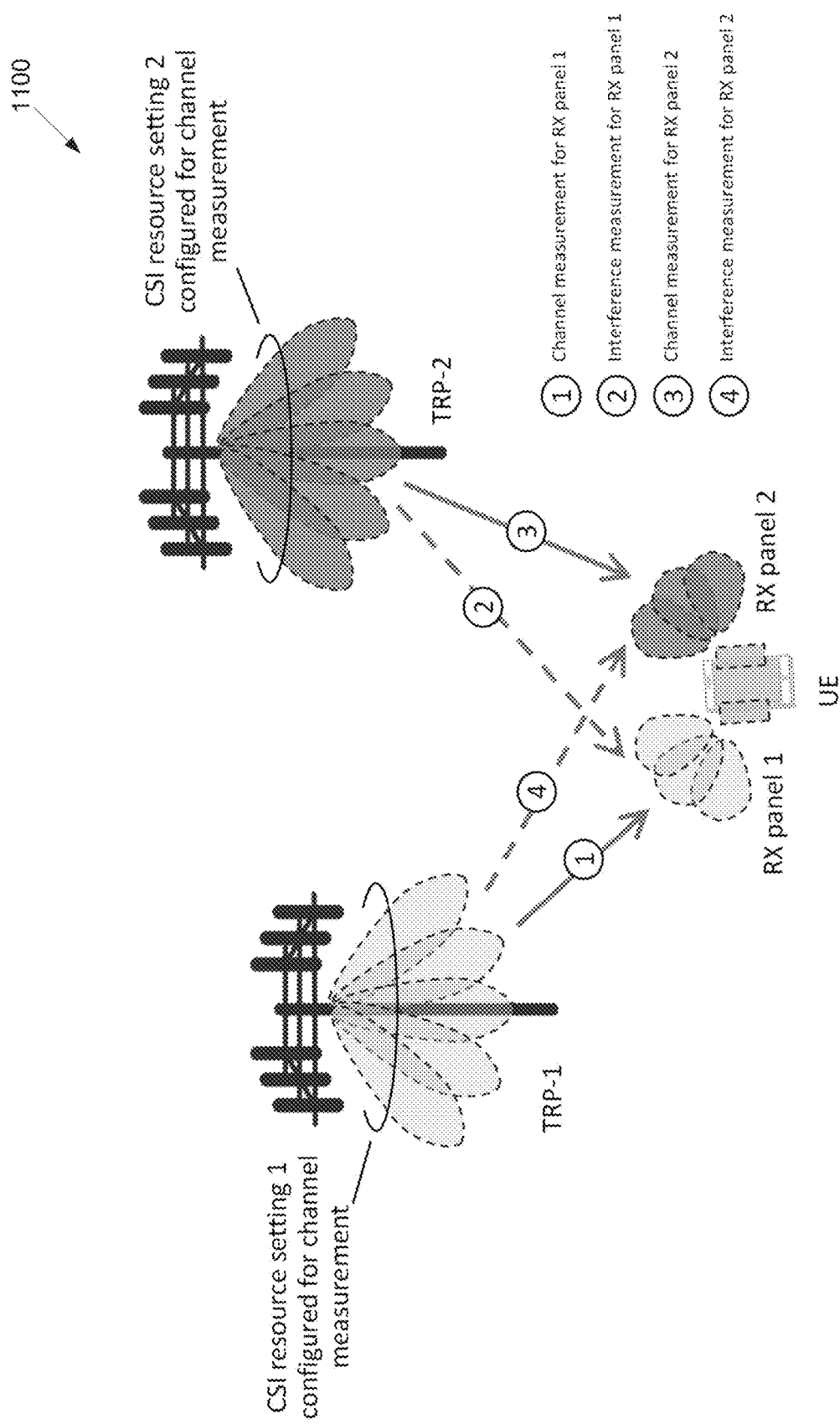
FIG. 11 illustrates another example of configuring channel measurement resource(s) and interference measurement resource(s) in a multi-TRP system according to embodiments of the present disclosure.

FIG. 11 illustrates another example of configuring channel measurement resource(s) and interference measurement resource(s) 1100 in a multi-TRP system according to embodiments of the present disclosure. An embodiment of configuring the channel measurement resource(s) and the interference measurement resource(s) 1100 in the multi-TRP system shown in FIG. 11 is for illustration only.

In the configured CSI reporting setting(s) (e.g., via the higher layer parameter CSI-ReportConfig(s)), the UE could be configured a list of (at least one) CSI resource settings (e.g., given by the higher layer parameter resourcesForChannelMeasurement) for channel measurement on NZP CSI-RS resource(s). As discussed in part 1.0 in this disclosure, more than one (M>1) CSI resource settings could be configured for the coordinating TRPs in the multi-TRP system. The UE could be indicated/configured by the network one or more CSI resource settings (out of the total M CSI resource settings configured for channel measurement) for a given RX panel (e.g., with RX panel ID/index #p) for channel measurement, and one or more CSI resource settings (out of the total M CSI resource settings configured for channel measurement) for the same RX panel (e.g., with RX panel ID/index #p) for interference measurement.

In FIG. 11, an illustrative example depicting the use of CSI resource settings (higher layer configured for channel measurement) for both channel and interference measurement for different RX panels at the UE is presented, wherein a multi-TRP system comprising of two TRPs (TRP-1 and TRP-2) and a UE equipped with two RX panels (RX panel 1 and RX panel 2) are considered.

Hence, for the configured CSI reporting setting with the higher layer parameter reportQuantity set to "cri-SINR" or "ssb-Index-SINR," in one example, the UE could receive from the network a bitmap of length M for/associated with a RX panel with each bit in the bitmap corresponding to a CSI resource setting from the M CSI resource settings configured for channel measurement. This bitmap could be used to indicate the CSI resource setting(s) (and therefore, the NZP CSI-RS resource(s) therein) for both channel measurement and interference measurement for the corresponding RX panel. This indication could be via higher layer (RRC) or/and MAC CE or/and DCI based signaling or/and any combination of at least two of RRC, MAC CE and DCI based signaling; this indication could be via a separate (dedicated) parameter or joint with another parameter; this indication could also include the corresponding RX panel information such as the RX panel ID/index. For instance, the UE may perform the channel measurement for the corresponding RX panel on the NZP CSI-RS resource(s) configured in one or more CSI resource settings whose bits/positions in the bitmap are configured as "1"s; the UE may also perform the interference measurement for the corresponding RX panel on the NZP CSI-RS resource(s) configured in one or more CSI resource settings whose bits/positions in the bitmap are configured as "0"s. If the bitmap contains all "1"s, the UE may perform the channel measurement for the corresponding RX panel on all the NZP CSI-RS resources configured in the M CSI resource settings configured for channel measurement. If the bitmap contains all "0"s, the UE may perform the interference measurement for the corresponding RX panel on all the NZP CSI-RS resources configured in the M CSI resource settings configured for channel measurement.

For the configured CSI reporting setting with the higher layer parameter reportQuantity set to "cri-SINR" or "ssb-Index-SINR," in another example, the UE could receive from the network a fifth bitmap of length M for/associated with a RX panel with each bit in the bitmap corresponding to a CSI resource setting from the M CSI resource settings configured for channel measurement, and a sixth bitmap of length M for/associated with a RX panel with each bit in the bitmap corresponding to a CSI resource setting from the M CSI resource settings configured for channel measurement. The fifth bitmap could be used to indicate the CSI resource setting(s) (and therefore, the NZP CSI-RS resource(s) therein) for channel measurement for the corresponding RX panel. This indication of the fifth bitmap could be via higher layer (RRC) or/and MAC CE or/and DCI based signaling or/and any combination of at least two of RRC, MAC CE and DCI based signaling; this indication of the fifth bitmap could be via a separate (dedicated) parameter or joint with another parameter; this indication of the fifth bitmap could also include the corresponding RX panel information such as the RX panel ID/index. For instance, the UE may perform the channel measurement for the corresponding RX panel on the NZP CSI-RS resource(s) configured in one or more CSI resource settings whose bits/positions in the fifth bitmap are configured as "1"s; if the fifth bitmap contains all "1"s, the UE may perform the channel measurement for the corresponding RX panel on all the NZP CSI-RS resources configured in the M CSI resource settings configured for channel measurement. The sixth bitmap could be used to indicate the CSI resource setting(s) (and therefore, the NZP CSI-RS resource(s) therein) for interference measurement for the corresponding RX panel. This indication of the sixth bitmap could be via higher layer (RRC) or/and MAC CE or/and DCI based signaling or/and any combination of at least two of RRC, MAC CE and DCI based signaling; this indication of the sixth bitmap could be via a separate (dedicated) parameter or joint with another parameter; this indication of the sixth bitmap could also include the corresponding RX panel information such as the RX panel ID/index. For instance, the UE may perform the interference measurement for the corresponding RX panel on the NZP CSI-RS resource(s) configured in one or more CSI resource settings whose bits/positions in the sixth bitmap are configured as "1"s; if the sixth bitmap contains all "1"s, the UE may perform the interference measurement for the corresponding RX panel on all the NZP CSI-RS resources configured in the M CSI resource settings configured for channel measurement.

For the configured CSI reporting setting with the higher layer parameter reportQuantity set to "cri-SINR" or "ssb-Index-SINR," in yet another example, the UE could receive from the network a MAC-CE command selecting/activating one or more CSI resource setting(s) from the M CSI resource settings configured for channel measurement (and therefore, the NZP CSI-RS resource(s) therein) for the corresponding RX panel for channel measurement; the MAC-CE command could also include the RX panel information such as the RX panel ID/index. The CSI resource setting(s) not activated/selected via the MAC-CE command from the M CSI resource settings configured for channel measurement (and therefore, the NZP CSI-RS resource(s) therein) could be used by the UE for interference measurement for the corresponding RX panel. If the MAC-CE command activates all the M CSI resource settings configured for channel measurement, the UE may perform the channel measurement on all the NZP CSI-RS resources configured in the M CSI resource settings configured for channel measurement for the corresponding RX panel.

For the configured CSI reporting setting with the higher layer parameter reportQuantity set to "cri-SINR" or "ssb-Index-SINR," in yet another example, the UE could receive from the network a fifth MAC-CE command selecting/activating one or more CSI resource setting(s) from the M CSI resource settings configured for channel measurement (and therefore, the NZP CSI-RS resource(s) therein) for the corresponding RX panel for channel measurement; the fifth MAC-CE command could also include the RX panel information such as the RX panel ID/index. If the fifth MAC-CE command activates all the M CSI resource settings configured for channel measurement, the UE may perform the channel measurement on all the NZP CSI-RS resources configured in the M CSI resource settings configured for channel measurement for the corresponding RX panel. The UE could receive from the network a sixth MAC-CE command selecting/activating one or more CSI resource setting(s) from the M CSI resource settings configured for channel measurement (and therefore, the NZP CSI-RS resource(s) therein) for the corresponding RX panel for interference measurement; the sixth MAC-CE command could also include the RX panel information such as the RX panel ID/index. If the sixth MAC-CE command activates all the M CSI resource settings configured for channel measurement, the UE may perform the interference measurement on all the NZP CSI-RS resources configured in the M CSI resource settings configured for channel measurement for the corresponding RX panel.

For the configured CSI reporting setting with the higher layer parameter reportQuantity set to "cri-SINR" or "ssb-Index-SINR," in yet another example, the UE could autonomously determine which CSI resource setting(s) from the M CSI resource settings configured for channel measurement (and therefore, the NZP CSI-RS resource(s) therein) may be used for channel measurement and which CSI resource setting(s) from the M CSI resource settings configured for channel measurement (and therefore, the NZP CSI-RS resource(s) therein) may be used for interference measurement for a given RX panel, if the UE is configured to do so and/or if the UE does not receive any additional configuration/indication such as the bitmap(s) and the MAC-CE activation command(s) to indicate the CSI resource setting(s) (and therefore, the NZP CSI-RS resource(s) therein) for channel measurement and/or interference measurement for the corresponding RX panel.

Other methods to indicate the CSI resource setting(s) (and therefore, the NZP CSI-RS resource(s) therein) for channel/interference measurement, e.g., any combination of at least two of the above described design examples, are also possible.

The UE may assume that the NZP CSI-RS resource(s) used for channel measurement and the NZP CSI-RS resource(s) used for interference measurement configured in the same or across different CSI reporting setting(s) (e.g., via the higher layer parameter CSI-ReportConfig(s)) are QCL'ed with respect to "typeD." Each NZP CSI-RS resource used for channel measurement is associated with one NZP CSI-RS resource used for interference measurement by the ordering of the NZP CSI-RS resource used for channel measurement and the NZP CSI-RS resource used for interference measurement in the corresponding resource set(s). The number of NZP CSI-RS resources used for channel measurement equals to the number of NZP CSI-RS resources used for interference measurement.

The UE could receive/transmit from/to the network additional indication(s) to better support/enable the channel measurement resource(s) (CMR(s)) and/or interference measurement resource(s) (IMR(s)) configurations specified in part 1 (1.A, 1.B, and 1.C), part 2 (2.A, 2.B, and 2.C) and part 3 (3.A, 3.B, and 3.C) in this disclosure.

In one example, the UE could send to the network a capability report. For instance, the capability report could include the number of supported RX panels/sets of RX antenna ports/sets of measurement RSs such as SRSs/spatial domain RX filters; further, this capability report could also include the separation/isolation conditions between two or more of the supported RX panels/sets of RX antenna ports/sets of measurement RSs such as SRSs/spatial domain RX filters. For another example, the capability report could indicate to the network that the UE is capable of measuring the interference between the TRPs in the multi-TRP system (and therefore, computing the corresponding SINR metric(s)) using only CMRs; this capability report also implies that the network could set the higher layer parameter reportQuantity in the corresponding CSI reporting setting(s) as "cri-SINR" or "ssb-Index-SINR," but the network does not need to configure any NZP CSI-RS resources for interference measurement (e.g., via the higher layer parameter nzp-CSI-RS-ResourcesetForInterference) and/or the CSI-IM resources for interference measurement (e.g., via the higher layer parameter csi-IM-ResourcesForInterference) to the UE.

In another example, the UE could be configured/indicated by the network to follow one or more CMR(s)/IMR(s) configurations specified in part 1, part 2 and part 3 in this disclosure to measure and report the SINR(s) for the multi-TRP operation. This indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In yet another example, the UE could send to the network their RX panel information such as the RX panel ID/index along with the CSI/beam report(s) (resource indicator(s) such as SSBRI(s)/CRI(s) and the corresponding beam metric(s) such as L1-RSRP(s)/L1-SINR(s)). According to the reported RX panel information from the UE, the network could better configure the measurement resources (for both channel measurement and interference measurement) for each RX panel at the UE (e.g., follow those specified in part 3 in this disclosure).

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to:
receive a reporting setting, wherein the reporting setting is configured with a higher layer parameter reportQuantity that is set to at least cri-SINR;
receive a resource setting associated with the reporting setting, wherein the resource setting is configured with a higher layer parameter resourceType that is set to aperiodic, periodic, or semi-persistent; and
receive, based on the resource setting:
a first set of reference signals (RSs) through a first set of RS resources;
a second set of RSs through a second set of RS resources;
a third set of RSs through a third set of RS resources; and
a fourth set of RSs through a fourth set of RS resources; and
a processor operably coupled to the transceiver, the processor configured to:
measure at least one RS from the first or second sets of RSs;
determine, based on the measured at least one RS from the first or second sets of RSs a first layer-1 signal-to-noise and interference ratio (L1-SINR);
measure at least one RS from the third and fourth sets of RSs; and
determine, based on the measured at least one RS from the third and fourth sets of RSs, a second L1-SINR,
wherein the transceiver is further configured to transmit, in a single CSI reporting instance, the first and second L1-SINRs.

2. The UE of claim 1, wherein:
the first and second sets of RS resources are configured in the resource setting;
the first set of RS resources corresponds to a first channel state information (CSI) resource set, wherein the first CSI resource set corresponds to at least one of:
a synchronization signal block (SSB) resource set provided by a higher layer parameter CSI-SSB-ResourceSet; and
a non-zero power channel state information reference signal (NZP CSI-RS) resource set provided by a higher layer parameter nzp-CSI-RS-ResourceSet; and
the second set of RS resources corresponds to a second CSI resource set, wherein the second CSI resource set corresponds to at least one of:
a SSB resource set provided by a higher layer parameter CSI-SSB-ResourceSet; and
a NZP CSI-RS resource set provided by a higher layer parameter nzp-CSI-RS-ResourceSet.

3. The UE of claim 1, wherein:
the first and second sets of RS resources are configured in the resource setting;
the first set of RS resources corresponds to a channel state information (CSI) resource set, wherein the CSI resource set corresponds to at least one of:
a synchronization signal block (SSB) resource set provided by a higher layer parameter CSI-SSB-ResourceSet; and
a non-zero power channel state information reference signal (NZP CSI-RS) resource set provided by a higher layer parameter nzp-CSI-RS-ResourceSet; and
the second set of RS resources corresponds to at least one of:
a CSI interference measurement (CSI-IM) resource set provided by a higher layer parameter CSI-IM-ResourceSet; and
a NZP CSI-RS resource set for interference measurement provided by a higher layer parameter nzp-CSI-RS-ResourceSetForInterference.

4. The UE of claim 1, wherein:
the third and fourth sets of RS resources are configured in the resource setting;
the third set of RS resources corresponds to channel state information (CSI) resource set,
wherein the CSI resource set corresponds to at least one of:
a synchronization signal block (SSB) resource set provided by a higher layer parameter CSI-SSB-ResourceSet; and
a non-zero power channel state information reference signal (NZP CSI-RS) resource set provided by a higher layer parameter nzp-CSI-RS-ResourceSet; and
the fourth set of RS resources corresponds to at least one of:
a CSI interference measurement (CSI-IM) resource set provided by a higher layer parameter CSI-IM-ResourceSet; and
a NZP CSI-RS resource set for interference measurement provided by a higher layer parameter nzp-CSI-RS-ResourceSetForInterference.

5. The UE of claim 1, wherein:
the at least one RS from the first or second sets of RSs is a first RS in the first set of RSs,
the processor is further configured to measure a second RS in the second set of RSs, and
the determined first L1-SINR is based on the measured first and second RSs.

6. A base station (BS), comprising:
a transceiver configured to:
   transmit a reporting setting, wherein the reporting setting is configured with a higher layer parameter reportQuantity that is set to at least cri-SINR;
   transmit a resource setting associated with the reporting setting, wherein the resource setting is configured with a higher layer parameter resourceType that is set to aperiodic, periodic, or semi-persistent;
   transmit, based on the resource setting:
      a first set of reference signals (RSs) through a first set of RS resources;
      a second set of RSs through a second set of RS resources;
      a third set of RSs through a third set of RS resources; and
      a fourth set of RSs through a fourth set of RS resources; and
   receive, in a single CSI reporting instance, first and second layer-1 signal-to-noise and interference ratios (L1-SINRs),
wherein the first L1-SINR is based on measurement of at least one RS from the first or second sets of RSs, and
wherein the second L1-SINR is based on measurement of at least one RS from the third and fourth sets of RSs.

7. The BS of claim 6, wherein:
the first and second sets of RS resources are configured in the resource setting;
the first set of RS resources corresponds to a first channel state information (CSI) resource set, wherein the first CSI resource set corresponds to at least one of:
   a synchronization signal block (SSB) resource set provided by a higher layer parameter CSI-SSB-ResourceSet; and
   a non-zero power channel state information reference signal (NZP CSI-RS) resource set provided by a higher layer parameter nzp-CSI-RS-ResourceSet; and
the second set of RS resources corresponds to a second CSI resource set, wherein the second CSI resource set corresponds to at least one of:
   a SSB resource set provided by a higher layer parameter CSI-SSB-ResourceSet; and
   a NZP CSI-RS resource set provided by a higher layer parameter nzp-CSI-RS-ResourceSet.

8. The BS of claim 6, wherein:
the first and second sets of RS resources are configured in the resource setting;
the first set of RS resources corresponds to a channel state information (CSI) resource set, wherein the CSI resource set corresponds to at least one of:
   a synchronization signal block (SSB) resource set provided by a higher layer parameter CSI-SSB-ResourceSet; and
   a non-zero power channel state information reference signal (NZP CSI-RS) resource set provided by a higher layer parameter nzp-CSI-RS-ResourceSet; and
the second set of RS resources corresponds to at least one of:
   a CSI interference measurement (CSI-IM) resource set provided by a higher layer parameter CSI-IM-ResourceSet; and
   a NZP CSI-RS resource set for interference measurement provided by a higher layer parameter nzp-CSI-RS-ResourceSetForInterference.

9. The BS of claim 8, wherein:
third and fourth sets of RS resources are configured in the resource setting;
the third set of RS resources corresponds to channel state information (CSI) resource set, wherein the CSI resource set corresponds to at least one of:
   a synchronization signal block (SSB) resource set provided by a higher layer parameter CSI-SSB-ResourceSet; and
   a non-zero power channel state information reference signal (NZP CSI-RS) resource set provided by a higher layer parameter nzp-CSI-RS-ResourceSet; and
the fourth set of RS resources corresponds to at least one of:
   a CSI interference measurement (CSI-IM) resource set provided by a higher layer parameter CSI-IM-ResourceSet; and
   a NZP CSI-RS resource set for interference measurement provided by a higher layer parameter nzp-CSI-RS-ResourceSetForInterference.

10. The BS of claim 6, wherein:
the at least one RS from the first or second sets of RSs is a first RS in the first set of RSs, and
the first L1-SINR is based on measurement of the first RS and a second RSs in the second set of RS.

11. A method for operating a user equipment (UE), the method comprising:
receiving a reporting setting, wherein the reporting setting is configured with a higher layer parameter reportQuantity that is set to at least cri-SINR;
receiving a resource setting associated with the reporting setting, wherein the resource setting is configured with a higher layer parameter resourceType that is set to aperiodic, periodic, or semi-persistent;
receiving, based on the resource setting:
   a first set of reference signals (RSs) through a first set of RS resources;
   a second set of RSs through a second set of RS resources;
   a third set of RSs through a third set of RS resources; and
   a fourth set of RSs through a fourth set of RS resources;
measuring at least one RS from the first or second sets of RSs;
determining, based on the measured at least one RS from the first or second sets of RSs, a first layer-1 signal-to-noise and interference ratio (L1-SINR);
measuring at least one RS from the third and fourth sets of RSs;
determining, based on the measured at least one RS from the third and fourth sets of RSs, a second L1-SINR; and
transmitting, in a single CSI reporting instance, the first and second L1-SINRs.

12. The method of claim 11, wherein:
the first and second sets of RS resources are configured in the resource setting;

the first set of RS resources corresponds to a first channel state information (CSI) resource set, wherein the first CSI resource set corresponds to at least one of:
- a synchronization signal block (SSB) resource set provided by a higher layer parameter CSI-SSB-ResourceSet; and
- a non-zero power channel state information reference signal (NZP CSI-RS) resource set provided by a higher layer parameter nzp-CSI-RS-ResourceSet; and the second set of RS resources corresponds to a second CSI resource set, wherein the second CSI resource set corresponds to at least one of:
- a SSB resource set provided by a higher layer parameter CSI-SSB-ResourceSet; and
- a NZP CSI-RS resource set provided by a higher layer parameter nzp-CSI-RS-ResourceSet.

13. The method of claim 11, wherein:
the first and second sets of RS resources are configured in the resource setting;
the first set of RS resources corresponds to a channel state information (CSI) resource set, wherein the CSI resource set corresponds to at least one of:
- a synchronization signal block (SSB) resource set provided by a higher layer parameter CSI-SSB-ResourceSet; and
- a non-zero power channel state information reference signal (NZP CSI-RS) resource set provided by a higher layer parameter nzp-CSI-RS-ResourceSet; and the second set of RS resources corresponds to at least one of:
- a CSI interference measurement (CSI-IM) resource set provided by a higher layer parameter CSI-IM-ResourceSet; and
- a NZP CSI-RS resource set for interference measurement provided by a higher layer parameter nzp-CSI-RS-ResourceSetForInterference.

14. The method of claim 11, wherein:
the third and fourth sets of RS resources are configured in the resource setting;
the third set of RS resources corresponds to channel state information (CSI) resource set, wherein the CSI resource set corresponds to at least one of:
- a synchronization signal block (SSB) resource set provided by a higher layer parameter CSI-SSB-ResourceSet; and
- a non-zero power channel state information reference signal (NZP CSI-RS) resource set provided by a higher layer parameter nzp-CSI-RS-ResourceSet; and the fourth set of RS resources corresponds to at least one of:
- a CSI interference measurement (CSI-IM) resource set provided by a higher layer parameter CSI-IM-ResourceSet; and
- a NZP CSI-RS resource set for interference measurement provided by a higher layer parameter nzp-CSI-RS-ResourceSetForInterference.

15. The method of claim 11, further comprising:
measuring a second RS in the second set of RSs,
wherein the at least one RS from the first or second sets of RSs is a first RS in the first set of RSs and wherein the determined first L1-SINR is determined based on the measured first and second RSs.

* * * * *